(12) United States Patent
Cradit et al.

(10) Patent No.: US 11,491,868 B2
(45) Date of Patent: Nov. 8, 2022

(54) AXLE ASSEMBLY HAVING A GEAR REDUCTION MODULE WITH MULTIPLE GEAR SETS

(71) Applicant: ArvinMeritor Technology, LLC, Troy, MI (US)

(72) Inventors: Jeremy Cradit, Troy, MI (US); Nick Bofferding, Troy, MI (US); David Zueski, Troy, MI (US); Robert Martin, Troy, MI (US); Eric LaMothe, Troy, MI (US); Christopher Keeney, Troy, MI (US); Brian Hayes, Troy, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 17/197,390

(22) Filed: Mar. 10, 2021

(65) Prior Publication Data

US 2022/0289023 A1 Sep. 15, 2022

(51) Int. Cl.
  *B60K 17/08* (2006.01)
  *F16H 3/66* (2006.01)
  *B60K 1/00* (2006.01)
(52) U.S. Cl.
  CPC .............. *B60K 17/08* (2013.01); *B60K 1/00* (2013.01); *F16H 3/66* (2013.01); *B60K 2001/001* (2013.01); *F16H 2200/201* (2013.01); *F16H 2200/2007* (2013.01); *F16H 2200/2094* (2013.01); *F16H 2702/02* (2013.01)

(58) Field of Classification Search
  CPC ........ B60K 17/08; B60K 1/00; B60K 17/046; B60K 2001/001; F16H 3/66; F16H 2200/2007; F16H 2200/201; F16H 2200/2094; F16H 2702/02
  See application file for complete search history.

(56) References Cited

U.S. PATENT DOCUMENTS

| 5,443,130 A * | 8/1995 | Tanaka ................... H02K 7/116 180/65.6 |
| 2008/0041653 A1* | 2/2008 | Rogg .................. B60W 10/196 180/338 |
| 2011/0177912 A1* | 7/2011 | Serkh ................... B62M 11/145 475/292 |
| 2012/0142474 A1* | 6/2012 | Troennberg .............. B60K 1/00 475/198 |
| 2019/0054816 A1* | 2/2019 | Garcia .................... F16H 48/08 |
| 2019/0054817 A1 | 2/2019 | Garcia et al. |
| 2019/0054818 A1 | 2/2019 | Garcia et al. |
| 2020/0173494 A1 | 6/2020 | Smith et al. |

(Continued)

OTHER PUBLICATIONS

Extended European Search Report dated Jul. 12, 2022 for related European Appln. No. 22159910.3; 7 Pages.

(Continued)

*Primary Examiner* — Timothy Hannon
*Assistant Examiner* — Farhana Pervin
(74) *Attorney, Agent, or Firm* — Brooks Kushman PC

(57) ABSTRACT

An axle assembly having a gear reduction unit that is configured to operatively connect an electric motor to a drive pinion. The gear reduction unit includes at least two gear sets. A shift collar is rotatable with the drive pinion and moveable along the drive pinion to couple a gear set to the drive pinion.

20 Claims, 13 Drawing Sheets

(56) References Cited

U.S. PATENT DOCUMENTS

| | | |
|---|---|---|
| 2020/0173531 A1 | 6/2020 | Smith |
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |

OTHER PUBLICATIONS

India First Examination Report for Indian Application No. 202214011829. dated Sep. 20, 2022, 6 pages.

* cited by examiner

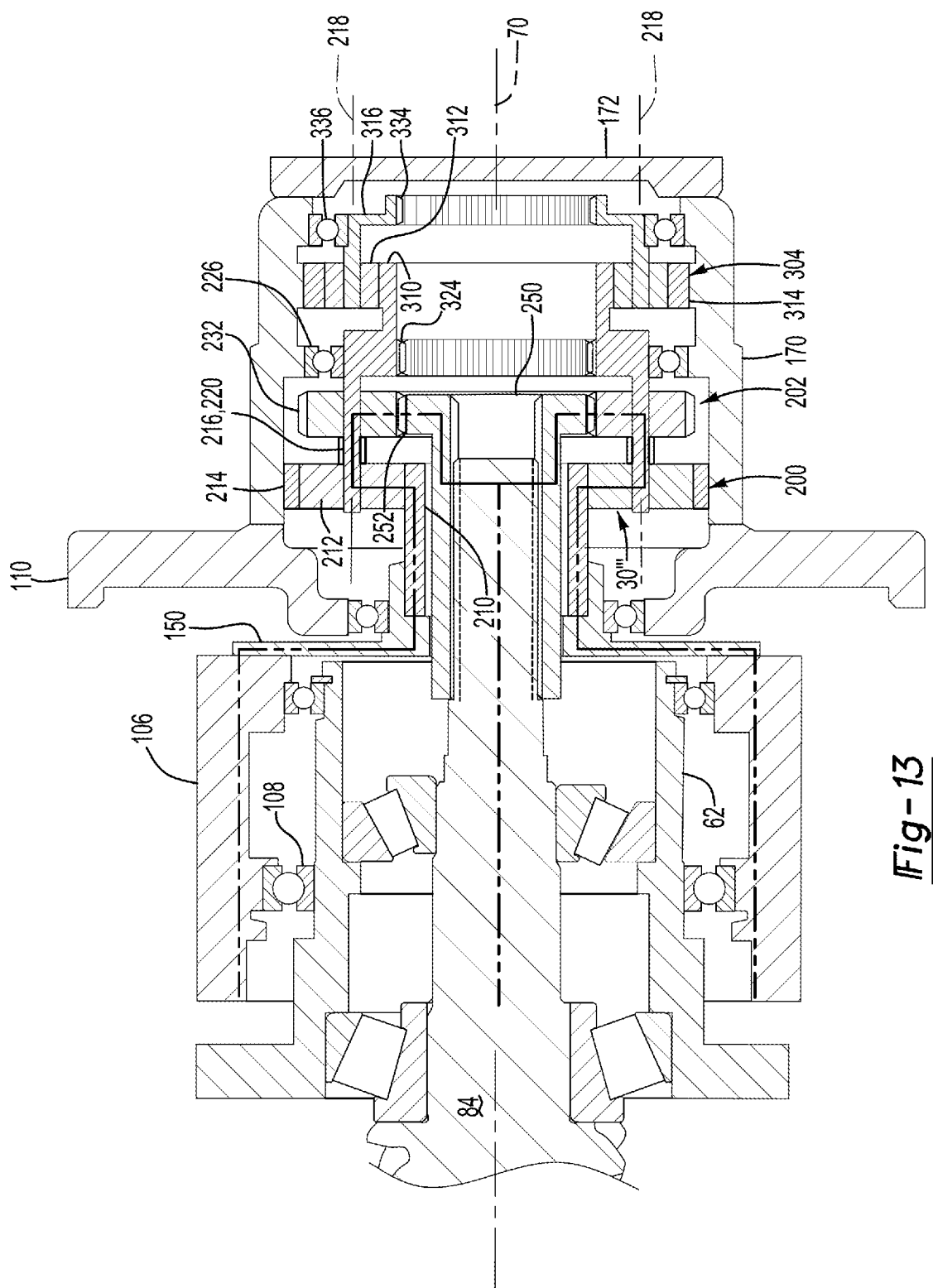

AXLE ASSEMBLY HAVING A GEAR REDUCTION MODULE WITH MULTIPLE GEAR SETS

TECHNICAL FIELD

This disclosure relates to an axle assembly having multiple gear sets that may operatively connect a rotor to a drive pinion.

BACKGROUND

An axle assembly having an electric motor module is disclosed in U.S. Patent Publication No. 2019/0054816.

SUMMARY

In at least one embodiment an axle assembly is provided. The axle assembly may include an electric motor, a drive pinion, a gear reduction unit, and a shift collar. The electric motor may have a rotor that is rotatable about an axis. The drive pinion may extend through the rotor and may be rotatable about the axis. The gear reduction unit may include a first gear set and a second gear set. The first gear set may have a first sun gear, a first planetary ring gear, a first set of planet gears, and a first planet gear carrier. The first sun gear may be operatively connected to the rotor and may be rotatable about the axis. The first planetary ring gear may be fixedly positioned such that the first planetary ring gear is not rotatable about the axis. The first set of planet gears may mesh with the first sun gear and the first planetary ring gear. The first planet gear carrier may rotatably support the first set of planet gears. The second gear set may have a second sun gear, a second planetary ring gear, a second set of planet gears, and a second planet gear carrier. The second sun gear may be rotatable about the axis. The second set of planet gears may mesh with the second sun gear and may be rotatably supported on the first planet gear carrier. Members of the second set of planet gears may have a smaller diameter than members of the first set of planet gears. The shift collar may be rotatable about the axis with the drive pinion. The shift collar may be moveable along the axis between a first position and a second position. The shift collar may couple the first planet gear carrier but not the first sun gear or the second sun gear to the drive pinion in the first position. The shift collar may couple the second sun gear but not the first sun gear or the first planet gear carrier to the drive pinion in the second position.

In at least one embodiment an axle assembly is provided. The axle assembly may include an electric motor, a drive pinion, a gear reduction unit, and a shift collar. The electric motor may have a rotor that is rotatable about an axis. The drive pinion may extend through the rotor and may be rotatable about the axis. The gear reduction unit may include an epicyclic gear set, a first gear set, and a second gear set. The epicyclic gear set may have an epicyclic sun gear, an epicyclic planetary ring gear, a set of epicyclic planet gears, and an epicyclic planet gear carrier. The epicyclic sun gear may be operatively connected to the rotor and may be rotatable about the axis. The epicyclic planetary ring gear may be rotatable about the axis. The set of epicyclic planet gears may mesh with the epicyclic sun gear and the epicyclic planetary ring gear. The epicyclic planet gear carrier may rotatably support the set of epicyclic planet gears and may be fixedly positioned such that the epicyclic planet gear carrier is not rotatable about the axis. The first gear set may have a first sun gear, a first planetary ring gear, a first set of planet gears, and a first planet gear carrier. The first sun gear may be fixedly positioned with respect to the epicyclic planetary ring gear such that the first sun gear does not rotate with respect to the epicyclic planetary ring gear. The first planetary ring gear may be fixedly positioned such that the first planetary ring gear is not rotatable about the axis. The first set of planet gears may mesh with the first sun gear and the first planetary ring gear. The first planet gear carrier may rotatably support the first set of planet gears. The second gear set may have a second sun gear and a second set of planet gears. The second sun gear may be rotatable about the axis. The second set of planet gears may mesh with the second sun gear and may be rotatably supported on the first planet gear carrier. Members of the second set of planet gears may have a smaller diameter than members of the first set of planet gears. The shift collar may be rotatable about the axis with the drive pinion. The shift collar may be moveable along the axis between a first position and a second position. The shift collar may couple the first planet gear carrier but not the first sun gear, the second sun gear, or the epicyclic sun gear to the drive pinion in the first position. The shift collar may couple the second sun gear but not the epicyclic sun gear, the first sun gear, or the first planet gear carrier to the drive pinion in the second position.

In at least one embodiment an axle assembly is provided. The axle assembly may include an electric motor, a drive pinion, a gear reduction unit, and a shift collar. The electric motor may have a rotor that is rotatable about an axis. The drive pinion may be received inside the rotor and may be rotatable about the axis. The gear reduction unit may include an epicyclic gear set, a first gear set, and a second gear set. The epicyclic gear set may have an epicyclic sun gear, an epicyclic planetary ring gear, a set of epicyclic planet gears, and an epicyclic planet gear carrier. The epicyclic sun gear may be fixedly positioned such that the epicyclic sun gear may not be rotatable about the axis. The epicyclic planetary ring gear may be operatively connected to the rotor and may be rotatable with the rotor about the axis. The set of epicyclic planet gears may mesh with the epicyclic sun gear and the epicyclic planetary ring gear. The epicyclic planet gear carrier may rotatably support the set of epicyclic planet gears and may be fixedly positioned such that the epicyclic planet gear carrier is not rotatable about the axis. The first gear set may have a first sun gear, a first planetary ring gear, a first set of planet gears, and a first planet gear carrier. The first sun gear may be fixedly positioned with respect to the epicyclic planet gear carrier such that the first sun gear does not rotate with respect to the epicyclic planet gear carrier. The first planetary ring gear may be fixedly positioned such that the first planetary ring gear is not rotatable about the axis. The first set of planet gears may mesh with the first sun gear and the first planetary ring gear. The first planet gear carrier may rotatably support the first set of planet gears. The second gear set may have a second sun gear and a second set of planet gears. The second sun gear may be rotatable about the axis. The second set of planet gears may mesh with the second sun gear and may be rotatably supported on the first planet gear carrier. Members of the second set of planet gears may have a smaller diameter than members of the first set of planet gears. The shift collar may be rotatable about the axis with the drive pinion. The shift collar may be moveable along the axis between a first position and a second position. The shift collar may couple the first planet gear carrier but not the first sun gear, the second sun gear, or the epicyclic sun gear to the drive pinion in the first position. The shift collar may couple the second sun gear but not the epicyclic sun gear, the first sun gear or the first planet gear carrier to the drive pinion in the second position.

BRIEF DESCRIPTION OF THE DRAWINGS

FIGS. 12 and 13 show the shift collar in second and third positions, respectively.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
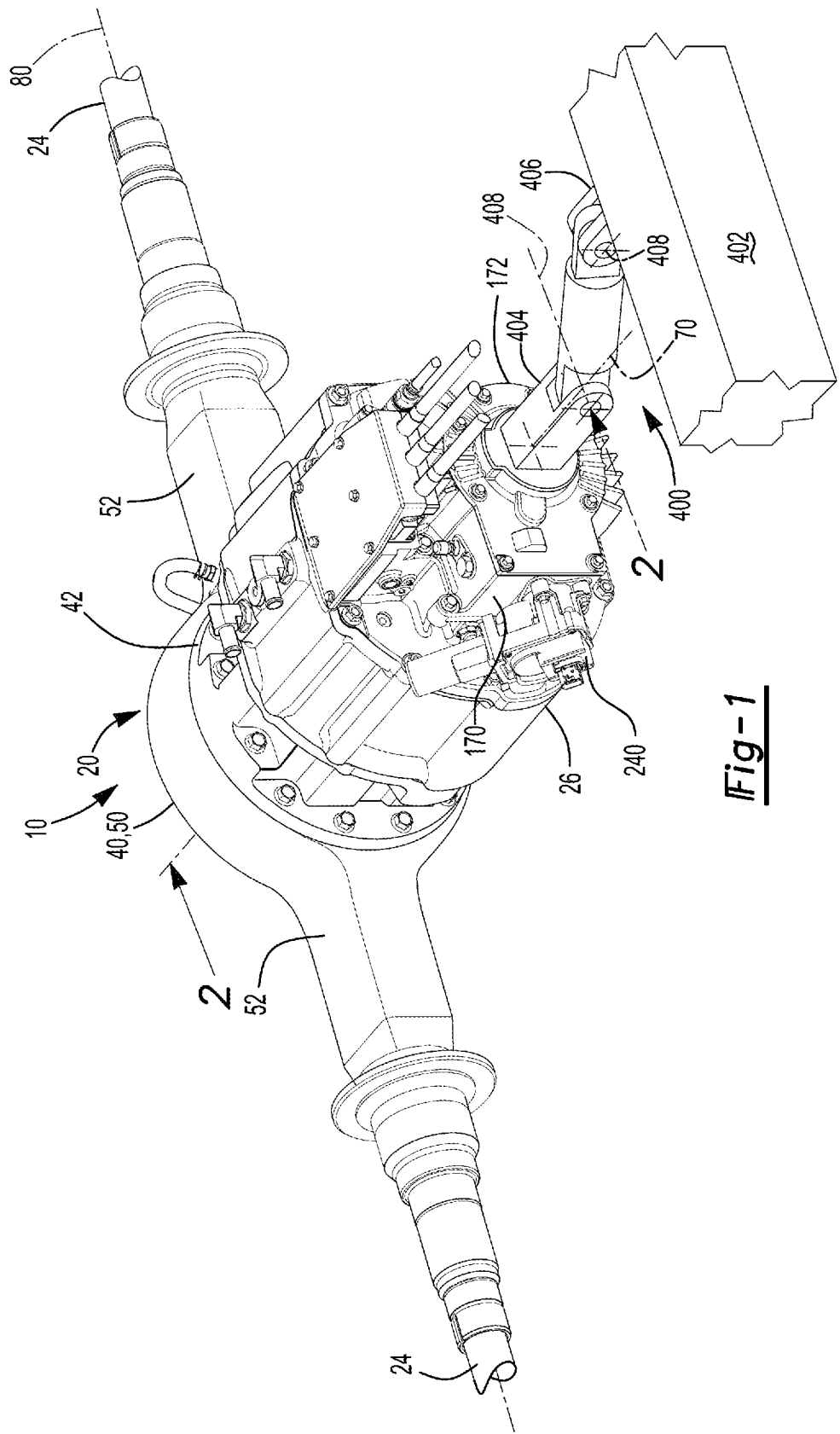
FIG. 1 is a perspective view of an example of an axle assembly.

Referring to FIG. 1, an example of an axle assembly 10 is shown. The axle assembly 10 may be provided with a motor vehicle like a truck, bus, farm equipment, mining equipment, military transport or weaponry vehicle, or cargo loading equipment for land, air, or marine vessels. The motor vehicle may include a trailer for transporting cargo in one or more embodiments.

The axle assembly 10 may provide torque to one or more traction wheel assemblies that may include a tire mounted on a wheel. The wheel may be mounted to a wheel hub that may be rotatable about a wheel axis.

Figure 2:
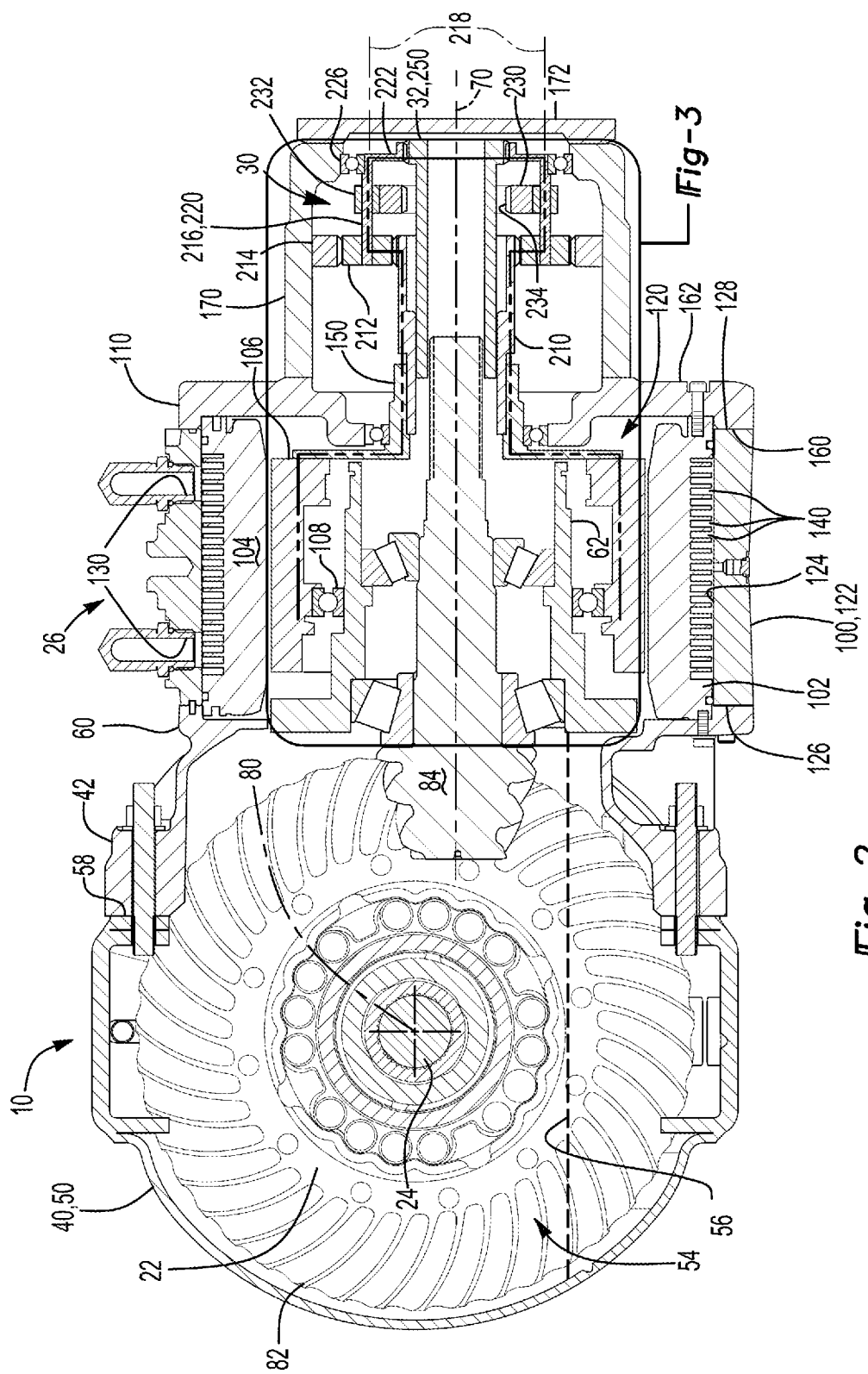
FIG. 2 is a section view of the axle assembly of FIG. 1 along section line 2-2.

One or more axle assemblies may be provided with the vehicle. As is best shown with reference to FIGS. 1 and 2, the axle assembly 10 may include a housing assembly 20, a differential assembly 22, at least one axle shaft 24, and an electric motor module 26. As is best shown in FIG. 2, the axle assembly 10 may include a gear reduction module 30 and a shift mechanism 32.

Housing Assembly

Referring to FIG. 1, the housing assembly 20 may receive various components of the axle assembly 10. In addition, the housing assembly 20 may facilitate mounting of the axle assembly 10 to the vehicle. In at least one configuration, the housing assembly 20 may include an axle housing 40 and a differential carrier 42.

The axle housing 40 may receive and may support the axle shafts 24. In at least one configuration, the axle housing 40 may include a center portion 50 and at least one arm portion 52.

The center portion 50 may be disposed proximate the center of the axle housing 40. The center portion 50 may define a cavity that may at least partially receive the differential assembly 22. As is best shown in FIG. 2, a lower region of the center portion 50 may at least partially define a sump portion 54 that may contain or collect lubricant 56. Lubricant 56 in the sump portion 54 may be splashed by a ring gear of the differential assembly 22 and distributed to lubricate various components.

Referring to FIG. 2, the center portion 50 may include a carrier mounting surface 58. The carrier mounting surface 58 may facilitate mounting of the differential carrier 42 to the axle housing 40. For example, the carrier mounting surface 58 may face toward and may engage the differential carrier 42 and may have a set of holes that may be aligned with corresponding holes on the differential carrier 42. Each hole may receive a fastener, such as a bolt, that may couple the differential carrier 42 to the axle housing 40.

Referring to FIG. 1, one or more arm portions 52 may extend from the center portion 50. For example, two arm portions 52 may extend in opposite directions from the center portion 50 and away from the differential assembly 22. The arm portions 52 may have substantially similar configurations. For example, the arm portions 52 may each have a hollow configuration or tubular configuration that may extend around and may receive a corresponding axle shaft 24 and may help separate or isolate the axle shaft 24 or a portion thereof from the surrounding environment. An arm portion 52 or a portion thereof may or may not be integrally formed with the center portion 50. It is also contemplated that the arm portions 52 may be omitted.

Referring to FIGS. 1 and 2, the differential carrier 42 may be mounted to the center portion 50 of the axle housing 40. The differential carrier 42 may support the differential assembly 22 and may facilitate mounting of the electric motor module 26. For example, the differential carrier may include one or more bearing supports that may support a roller bearing assembly that may rotatably support the differential assembly 22. The differential carrier 42 may also include a mounting flange 60 and a bearing support wall 62.

Referring to FIG. 2, the mounting flange 60 may facilitate mounting of the electric motor module 26. As an example, the mounting flange 60 may be configured as a ring that may extend outward and away from an axis 70 and may extend around the axis 70. In at least one configuration, the mounting flange 60 may include a set of fastener holes that may be configured to receive fasteners that may secure the electric motor module 26 to the mounting flange 60.

The bearing support wall 62 may support bearings that may rotatably support other components of the axle assembly 10. For example, the bearing support wall 62 may support bearings that may rotatably support a drive pinion 84, bearings that may rotatably support a rotor of the electric motor module 26, or both. The bearing support wall 62 may extend in an axial direction away from the axle housing 40 and may extend around the axis 70. The bearing support wall 62 may define a hole that may extend along or around the axis 70 and receive the drive pinion 84 and the bearings that rotatably support the drive pinion 84. The bearing support wall 62 may be integrally formed with the differential carrier 42 or may be a separate component that is fastened to the differential carrier 42.

Differential Assembly, Drive Pinion, and Axle Shafts

Referring to FIG. 2, the differential assembly 22 may be at least partially received in the center portion 50 of the housing assembly 20. The differential assembly 22 may be rotatable about a differential axis 80 and may transmit torque to the axle shafts 24 and wheels. The differential assembly 22 may be operatively connected to the axle shafts 24 and may permit the axle shafts 24 to rotate at different rotational speeds in a manner known by those skilled in the art. The differential assembly 22 may have a ring gear 82 that may have teeth the mate or mesh with the teeth of a gear portion of a drive pinion 84. Accordingly, the differential assembly 22 may receive torque from the drive pinion 84 via the ring gear 82 and transmit torque to the axle shafts 24.

The drive pinion 84 may provide torque to the ring gear 82. In an axle assembly that includes a gear reduction module 30, the drive pinion 84 may operatively connect the gear reduction module 30 to the differential assembly 22. In at least one configuration, the drive pinion 84 may be rotatable about the axis 70 and may be rotatably supported inside another component, such as the bearing support wall 62.

Referring to FIG. 1, the axle shafts 24 may transmit torque from the differential assembly 22 to corresponding wheel hubs and wheels. Two axle shafts 24 may be provided such that each axle shaft 24 extends through a different arm portion 52 of axle housing 40. The axle shafts 24 may extend along and may be rotatable about an axis, such as the differential axis 80. Each axle shaft 24 may have a first end and a second end. The first end may be operatively connected to the differential assembly 22. The second end may be disposed opposite the first end and may be operatively connected to a wheel. Optionally, gear reduction may be provided between an axle shaft 24 and a wheel.

Electric Motor Module

Referring to FIG. 2, the electric motor module 26, which may also be referred to as an electric motor, may be mounted to the differential carrier 42 and may be operatively connectable to the differential assembly 22. For instance, the electric motor module 26 may provide torque to the differential assembly 22 via the drive pinion 84 and a gear reduction module as will be discussed in more detail below. The electric motor module 26 may be primarily disposed outside the differential carrier 42. In addition, the electric motor module 26 may be axially positioned between the axle housing 40 and the gear reduction module 30. In at least one configuration, the electric motor module 26 may include a motor housing 100, a coolant jacket 102, a stator 104, a rotor 106, at least one rotor bearing assembly 108, and a cover 110.

The motor housing 100 may extend between the differential carrier 42 and the cover 110. The motor housing 100 may be mounted to the differential carrier 42 and the cover 110. For example, the motor housing 100 may extend from the mounting flange 60 of the differential carrier 42 to the cover 110. The motor housing 100 may extend around the axis 70 and may define a motor housing cavity 120. The motor housing cavity 120 may be disposed inside the motor housing 100 and may have a generally cylindrical configuration. The bearing support wall 62 of the differential carrier 42 may be located inside the motor housing cavity 120. Moreover, the motor housing 100 may extend continuously around and may be spaced apart from the bearing support wall 62. In at least one configuration, the motor housing 100 may have an exterior side 122, an interior side 124, a first end surface 126, a second end surface 128, and one or more ports 130.

The exterior side 122 may face away from the axis 70 and may define an exterior or outside surface of the motor housing 100.

The interior side 124 may be disposed opposite the exterior side 122. The interior side 124 may be disposed at a substantially constant radial distance from the axis 70 in one or more configurations.

The first end surface 126 may extend between the exterior side 122 and the interior side 124. The first end surface 126 may be disposed at an end of the motor housing 100 that may face toward the differential carrier 42. For instance, the first end surface 126 may be disposed adjacent to the mounting flange 60 of the differential carrier 42. The motor housing 100 and the first end surface 126 may or may not be received inside the mounting flange 60.

The second end surface 128 may be disposed opposite the first end surface 126. As such, the second end surface 128 may be disposed at an end of the motor housing 100 that may face toward and may engage the cover 110. The second end surface 128 may extend between the exterior side 122 and the interior side 124 and may or may not be received inside the cover 110.

One or more ports 130 may extend through the motor housing 100. The ports 130 may be configured as a through holes that may extend from the exterior side 122 to the interior side 124. The ports 130 may allow coolant, such as a fluid like water, a water/antifreeze mixture, or the like, to flow to and from the coolant jacket 102 as will be described in more detail below.

Referring to FIG. 2, the coolant jacket 102 may help cool or remove heat from the stator 104. The coolant jacket 102 may be received in the motor housing cavity 120 of the motor housing 100 and may engage the interior side 124 of the motor housing 100. The coolant jacket 102 may extend axially between the differential carrier 42 and the cover 110. For example, the coolant jacket 102 may extend axially from the differential carrier 42 to the cover 110. In addition, the coolant jacket 102 may extend around the axis 70 and the stator 104. As such, the stator 104 may be at least partially received in and may be encircled by the coolant jacket 102. Moreover, the coolant jacket 102 may extend in a radial direction from the stator 104 to the interior side 124 of the motor housing 100. In at least one configuration, the coolant jacket 102 may include a plurality of channels 140.

The channels 140 may extend around the axis 70 and may be disposed opposite the stator 104. The channels 140 may be configured with an open side that may face away from the axis 70 and toward the interior side 124 of the motor housing 100. Coolant may be provided to the coolant jacket 102 via a first port 130 and may exit the coolant jacket 102 via a second port 130. For instance, coolant may flow from the first port 130 into the channels 140, receive heat from the stator 104 as the coolant flows through the channels 140, and exit at the second port 130. One or more baffles may be provided with the coolant jacket 102 that may reverse or change the direction of coolant flow to help route coolant from the first port 130 to the second port 130.

The stator 104 may be received in the motor housing 100. For instance, the stator 104 may be received in the motor housing cavity 120. The stator 104 may be fixedly positioned with respect to the coolant jacket 102. For example, the stator 104 may extend around the axis 70 and may include stator windings that may be received inside and may be fixedly positioned with respect to the coolant jacket 102.

The rotor 106 may extend around and may be rotatable about the axis 70. The rotor 106 may be received inside the stator 104, the coolant jacket 102, and the motor housing cavity 120 of the motor housing 100. The rotor 106 may be rotatable about the axis 70 with respect to the differential carrier 42 and the stator 104. In addition, the rotor 106 may be spaced apart from the stator 104 but may be disposed in close proximity to the stator 104. The rotor 106 may include magnets or ferromagnetic material that may facilitate the generation of electrical current. The rotor 106 may extend around and may be supported by the bearing support wall 62.

One or more rotor bearing assemblies 108 may rotatably support the rotor 106. For example, a rotor bearing assembly 108 may receive the bearing support wall 62 of the differential carrier 42 and may be received inside of the rotor 106. The rotor 106 may be operatively connected to the drive pinion 84. For instance, a coupling such as a rotor output flange 150 may operatively connect the rotor 106 to the gear reduction module 30, which in turn may be operatively connectable with the drive pinion 84.

Referring to FIG. 2, the cover 110 may be mounted to the motor housing 100 and may be disposed opposite the axle housing 40 and the differential carrier 42. For example, the cover 110 may be mounted to an end or end surface of the motor housing 100, such as the second end surface 128, that may be disposed opposite the differential carrier 42. As such, the cover 110 may be spaced apart from and may not engage the differential carrier 42. The cover 110 may be provided in various configurations. In at least one configuration, the cover 110 may include a first side 160 and a second side 162. The first side 160 may face toward and may engage the motor housing 100. The second side 162 may be disposed opposite the first side 160. The second side 162 may face away from the motor housing 100 and may be disposed opposite the motor housing 100. The cover 110 may also include or define a motor cover opening that may be a through hole through which the drive pinion 84 may extend.

Gear Reduction Module and Shift Mechanism

Referring to FIG. 2, an example of a gear reduction module 30 is shown. The gear reduction module 30 may transmit torque between the electric motor module 26 and the differential assembly 22. As such, the gear reduction module 30 may operatively connect the electric motor module 26 and the differential assembly 22.

The gear reduction module 30 may be disposed outside of the differential carrier 42 and may be primarily disposed outside of the electric motor module 26 or entirely disposed outside the electric motor module 26, thereby providing a modular construction that may be mounted to the electric motor module 26 when gear reduction is desired. For instance, the gear reduction module 30 may include a gear reduction module housing 170 that may receive gears of the gear reduction module 30. The gear reduction module housing 170 may be provided in various configurations. For instance, the gear reduction module housing 170 may be a separate component that is mounted to the cover 110 or may be integrally formed with the cover 110. The gear reduction module housing 170 may extend from the second side 162 of the cover 110 in a direction that extends away from the electric motor module 26. A gear reduction module cover 172 may be disposed on the gear reduction module housing 170 and may be removable to provide access to components located inside the gear reduction module housing 170.

The gear reduction module may be provided in various configurations and may include multiple gear sets that are operatively connected to each other. These gear sets may be configured as epicyclic gear sets in which one or more planet gears may revolve or rotate about a central sun gear. Each planet gear may be rotatable about a corresponding axis that may be positioned at a constant or substantially constant radial distance from the axis about which the central sun gear rotates. A particular gear set may or may not have a planetary ring gear that extends around and meshes with the planet gears. For clarity, each gear set is designated with a different name in the discussion below.

Four main configurations of gear reduction modules 30, 30', 30'', 30''' are described below and are best shown in FIGS. 3-13. It is to be understood that each gear reduction module configuration can be provided with an axle assembly as described above (i.e., with an axle assembly having a housing assembly 20, differential assembly 22, at least one axle shaft 24, electric motor module 26, shift mechanism 32, drive pinion 84, and a gear reduction module housing 170. Accordingly, magnified views are shown in FIGS. 3-13 to better depict each gear reduction module configuration rather than the remainder of the axle assembly. Each magnified view is a section view along the axis 70. In these figures, torque transmission paths between the electric motor module 26 and drive pinion 84 are represented by double-dash lines that are thickened, straight, and not numbered.

Figure 3:
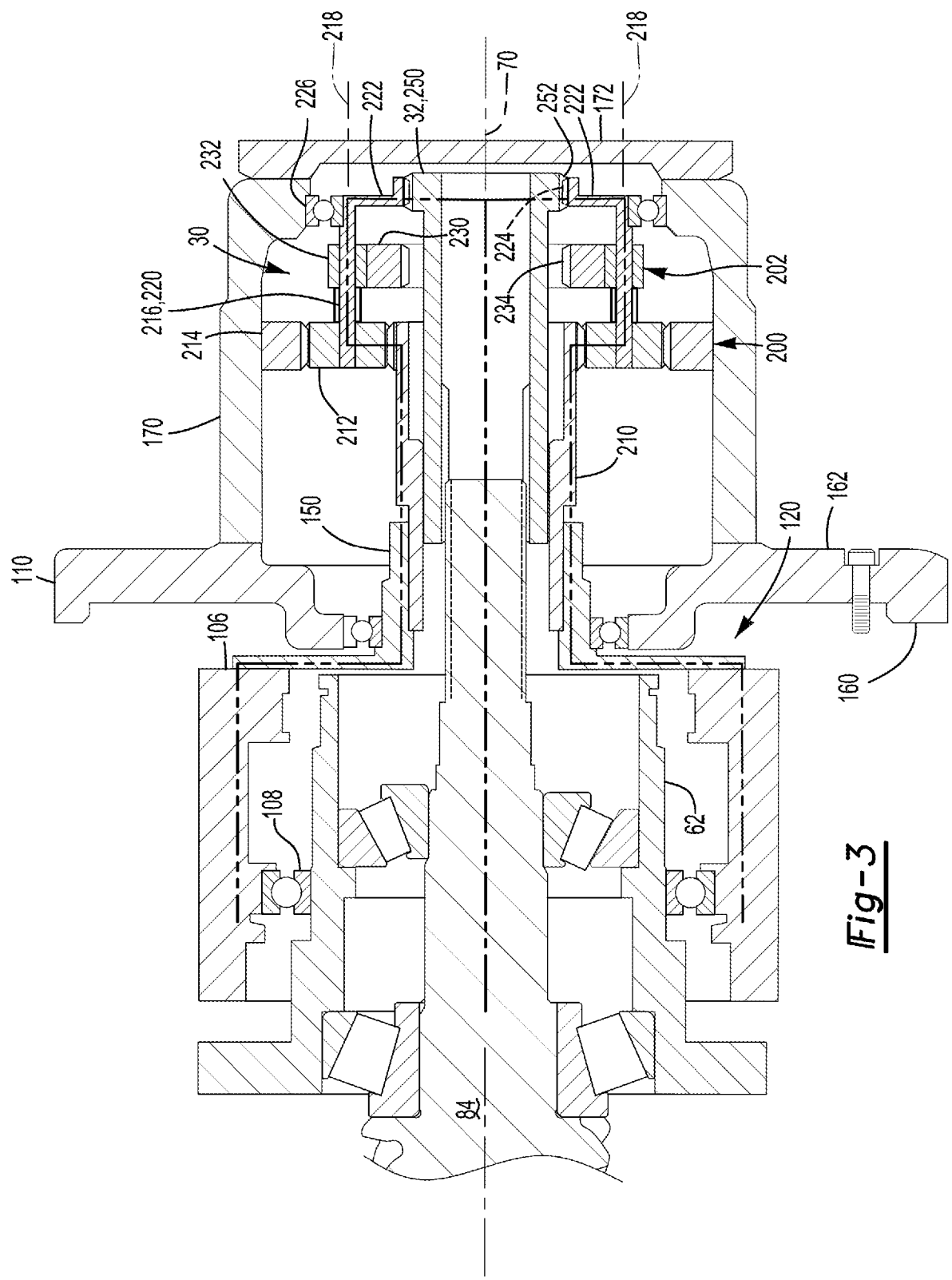
FIG. 3 is a magnified view of a portion of FIG. 2 showing a gear reduction unit and a shift collar in a first position.
Figure 4:
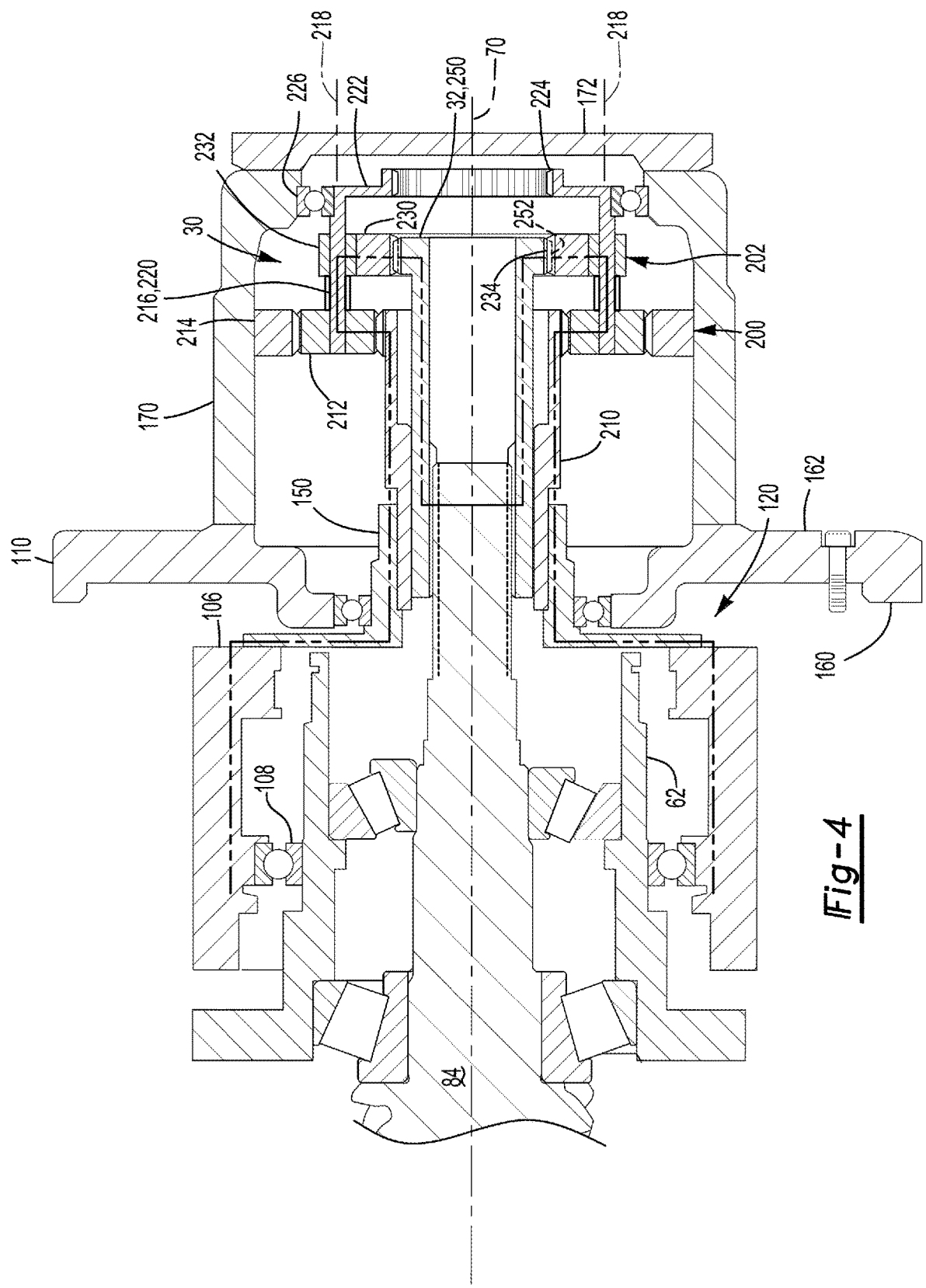
FIG. 4 shows the shift collar in a second position.

Referring to FIGS. 3 and 4, a first configuration of a gear reduction module 30 is shown. The gear reduction module 30 may include a first gear set 200 and a second gear set 202.

The first gear set 200 may be axially positioned along the axis 70 between the electric motor module 26 and the second gear set 202. The first gear set 200 may be configured as a planetary gear set. For instance, the first gear set 200 may include a first sun gear 210, a first set of planet gears 212, a first planetary ring gear 214, and a first planet gear carrier 216.

The first sun gear 210 may be operatively connected to the rotor 106. For instance, the first sun gear 210 may be operatively connected to the rotor 106 via the rotor output flange 150. As such, the first sun gear 210 may be rotatable about the axis 70 with the rotor 106 and the rotor output flange 150. Optionally, the first sun gear 210 may extend around and may receive the drive pinion 84.

The first set of planet gears 212 may be rotatably disposed between the first sun gear 210 and the first planetary ring gear 214. Each first planet gear 212 may have teeth that may mesh with teeth of the first sun gear 210 that may extend away from the axis 70 and teeth of the first planetary ring gear 214 that may extend toward the axis 70. In addition, each first planet gear 212 may be rotatable about a corresponding planet gear axis 218.

The first planetary ring gear 214 may extend around the axis 70 and may receive the first set of planet gears 212. The first planetary ring gear 214 may be fixedly positioned such that the first planetary ring gear 214 is not rotatable about the axis 70. For instance, the first planetary ring gear 214 may be received inside and may be fixedly coupled to the gear reduction module housing 170 such that the first planetary ring gear 214 may not be rotatable about the axis 70.

The first planet gear carrier 216 may rotatably support the first set of planet gears 212. In addition, the first planet gear carrier 216 may be rotatable about the axis 70. The first planet gear carrier 216 may extend toward and may be operatively connected to the second gear set 202. In at least one configuration, the first planet gear carrier 216 may include a support portion 220, a flange portion 222, and a gear portion 224.

The support portion 220 may rotatably support the first set of planet gears 212. The support portion 220 may have any suitable configuration. For instance, the support portion 220 may include a plurality of pins that may extend along each planet gear axis 218 and that may be received inside a hole in each first planet gear 212. A roller bearing assembly may be received inside the hole in each first planet gear 212 and may extend around each pin to help rotatably support each first planet gear 212.

The flange portion 222 may extend from an end of the support portion 220 toward the axis 70. The flange portion 222 may be axially positioned along the axis 70 between the gear reduction module cover 172 and the second gear set 202.

The gear portion 224 may extend from the flange portion 222 toward the axis 70. The gear portion 224 may include a plurality of teeth that may be arranged around the axis 70 in a repeating pattern. The teeth of the gear portion 224 may extend toward the axis 70 and may be arranged substantially parallel to the axis 70. The gear portion 224 may be selectively engaged by a shift collar 250 as will be discussed in more detail below.

A support bearing assembly 226 may rotatably support the first planet gear carrier 216. The support bearing assembly 226 may extend from the gear reduction module housing 170 to the first planet gear carrier 216. For instance, the support bearing assembly 226 may be received inside the gear reduction module housing 170 and the first planet gear carrier 216 may be received inside the support bearing assembly 226. The support bearing assembly 226 may be disposed proximate the flange portion 222 of the first planet gear carrier 216 and may be axially positioned between the second gear set 202 and the gear reduction module cover 172. As such, the second gear set 202 may be axially positioned along the axis 70 between the first gear set 200 and the support bearing assembly 226.

The second gear set 202 may be operatively connected to the first gear set 200. Notwithstanding the first planet gear carrier 216, the second gear set 202 may be spaced apart from the first gear set 200. The second gear set 202 may include a second sun gear 230 and a second set of planet gears 232. A planetary ring gear may be omitted from the second gear set 202 in one or more configurations.

The second sun gear 230 may be rotatable about the axis 70. The second sun gear 230 may extend around and may receive the shift collar 250. In addition, the second sun gear 230 may include a set of internal teeth 234. The set of internal teeth 234 may be disposed inside a hole that is defined by the second sun gear 230 and may extend toward the axis 70. The set of internal teeth 234 may include a plurality of teeth that may be arranged around the axis 70 in a repeating pattern. The internal teeth 234 may extend toward the axis 70 and may be arranged substantially parallel to the axis 70. The set of internal teeth 234 may be selectively engaged by a shift collar 250 as will be discussed in more detail below.

The second set of planet gears 232 may be rotatably disposed on the second sun gear 230. Each second planet gear 232 may have teeth that may mesh with teeth of the second sun gear 230 that may extend away from the axis 70. Each second planet gear 232 may be rotatable about a corresponding planet gear axis, which may be disposed parallel to planet gear axis 218. The planet gear axis for each second planet gear 232 may or may not be disposed at a different distance from the axis 70 than the planet gear axis 218. In at least one configuration, members of the second set of planet gears 232 may have a smaller diameter than members of the first set of planet gears 212. The second set of planet gears 232 may be rotatably supported on the first planet gear carrier 216. Each second planet gear 232 may be axially positioned between the first gear set 200 or a member of the first set of planet gears 212 and the flange portion 222 of the first planet gear carrier 216. Teeth of the second set of planet gears 232 may only mesh with teeth of the second sun gear 230 when a planetary ring gear is not provided with the second gear set 202.

Referring to FIG. 2, the shift mechanism 32 may cooperate with the gear reduction module 30 to provide a desired gear reduction ratio to change the torque transmitted between the electric motor module 26 and the differential assembly 22, and hence to or from the axle shafts 24 of the axle assembly 10. The shift mechanism 32 may have any suitable configuration. For instance, the shift mechanism 32 may include an actuator 240, which is best shown in FIG. 1, and a shift collar 250.

Referring to FIG. 1, the actuator 240 may be configured to move the shift collar 250 along the axis 70 to selectively couple a gear set of the gear reduction module 30 to the drive pinion 84 or decouple a gear set from the drive pinion 84. The actuator 240 may be of any suitable type and may be coupled to the shift collar 250 in any suitable manner, such as with a linkage like a shift fork.

Referring to FIG. 3, the shift collar 250 may be movable along the axis 70 to selectively couple a gear set to the drive pinion 84. For instance, the shift collar 250 may be disposed on the drive pinion 84 such that the shift collar 250 may be rotatable about the axis 70 with the drive pinion 84 and may be movable in an axial direction or along the axis 70 with respect to the drive pinion 84. The shift collar 250 may be received inside the first sun gear 210 and the second sun gear 230. The shift collar 250 may include teeth 252 that may extend away from the axis 70 that may be selectively engageable with corresponding teeth of the gear portion 224 of the first planet gear carrier 216 or the internal teeth 234 of the second sun gear 230 to facilitate the transmission of torque between the electric motor module 26 and the differential assembly 22 at a desired torque ratio. Although a single set of teeth 252 is shown, it is contemplated that multiple sets of teeth 252 may be provided on the shift collar 250 for selectively engaging a gear set.

The shift collar 250 may be moveable along the axis 70 between a first position and a second position.

Referring to FIG. 3, the shift collar 250 is shown in the first position. The shift collar 250 may couple the first planet gear carrier 216 to the drive pinion 84 when in the first position, thereby providing a first drive gear ratio. The teeth 252 of the shift collar 250 may engage and mesh with the teeth of the gear portion 224 of the first planet gear carrier 216 when in the first position. Torque may be transmitted from the rotor 106 to the first sun gear 210 such as via the rotor output flange 150, from the first sun gear 210 to the first planet gear carrier 216 via the first set of planet gears 212, and then from the first planet gear carrier 216 to the drive pinion 84 via the shift collar 250 when the shift collar 250 is in the first position. The shift collar 250 may not couple the first sun gear 210 or the second sun gear 230 to the drive pinion 84 when in the first position. As such, the first sun gear 210 and the second sun gear 230 may be rotatable about the axis 70 with respect to the drive pinion 84 when the shift collar 250 is in the first position.

Referring to FIG. 4, the shift collar 250 is shown in the second position. The shift collar 250 may couple the second sun gear 230 to the drive pinion 84 when in the second position, thereby providing a second drive gear ratio that may differ from the first drive gear ratio. As a nonlimiting example, the first gear ratio may be approximately 2.5 while the second gear ratio may be approximately 1.4. The teeth 252 of the shift collar 250 may engage and mesh with the internal teeth 234 of the second sun gear 230 when in the second position. Torque may be transmitted from the rotor 106 to the first sun gear 210 such as via the rotor output flange 150, from the first sun gear 210 to the first planet gear carrier 216 via the first set of planet gears 212, from the first planet gear carrier 216 to the second sun gear 230 via the second set of planet gears 232, and then from the second sun gear 230 to the drive pinion 84 via the shift collar 250 when the shift collar 250 is in the second position. The shift collar 250 may not couple the first sun gear 210 or the first planet gear carrier 216 to the drive pinion 84 when in the second position. As such, the first sun gear 210 and the first planet gear carrier 216 may be rotatable about the axis 70 with respect to the drive pinion 84 when the shift collar 250 is in the second position.

Figure 5:
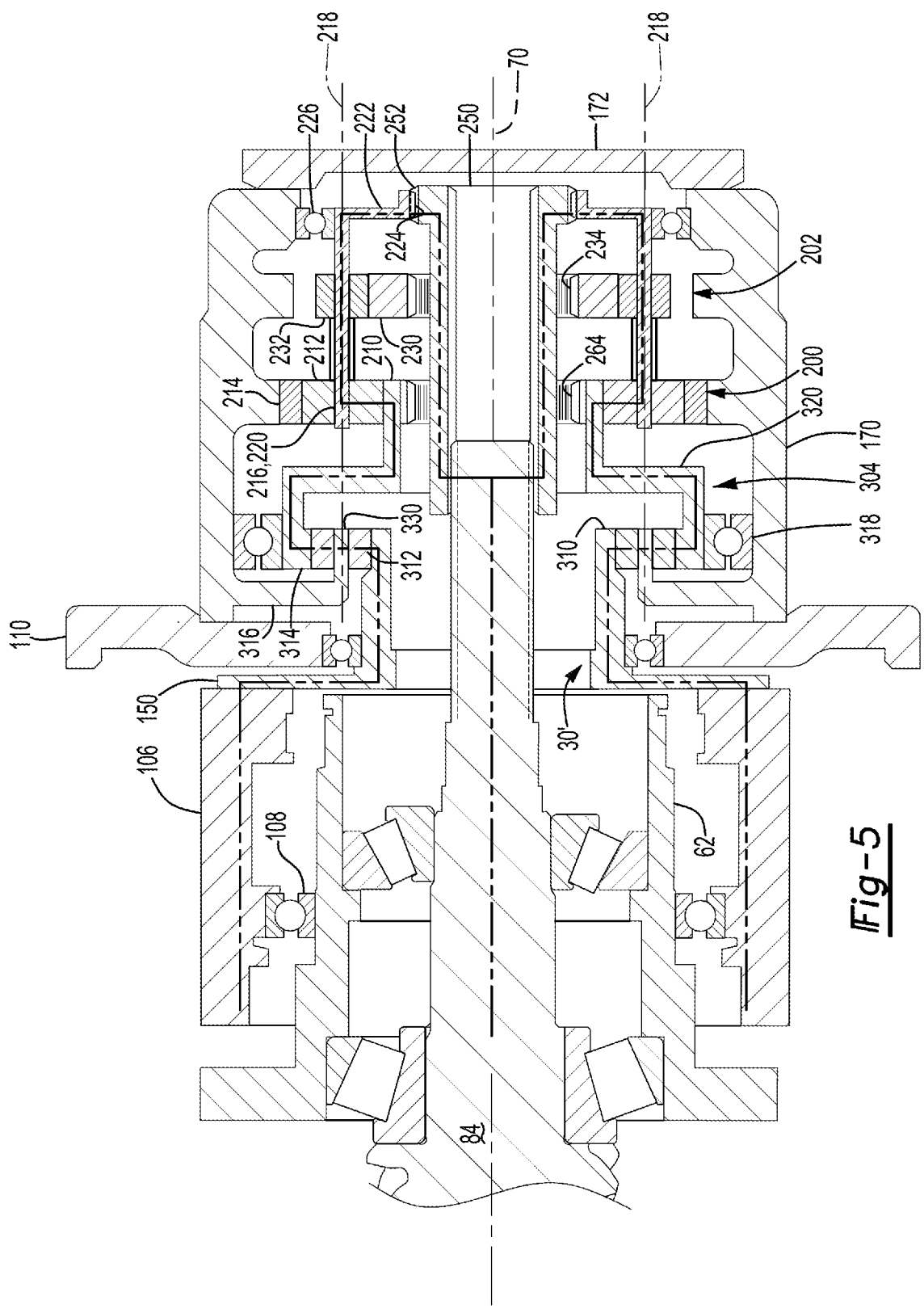
FIG. 5 is a magnified view that shows a second configuration of a gear reduction unit with a shift collar in a first position.
Figure 6:
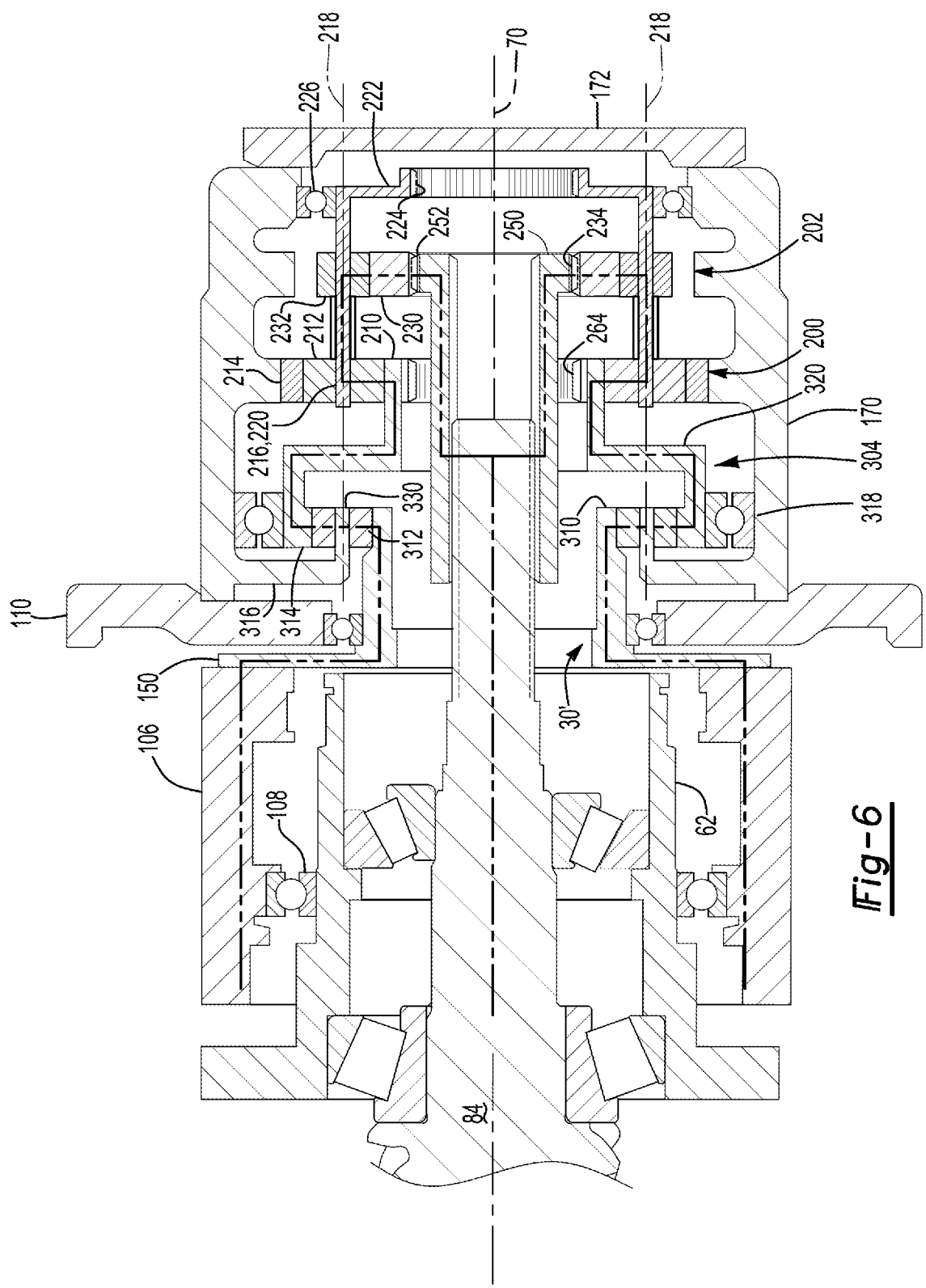
FIGS. 6 and 7 show the shift collar in second and third positions, respectively.
Figure 7:
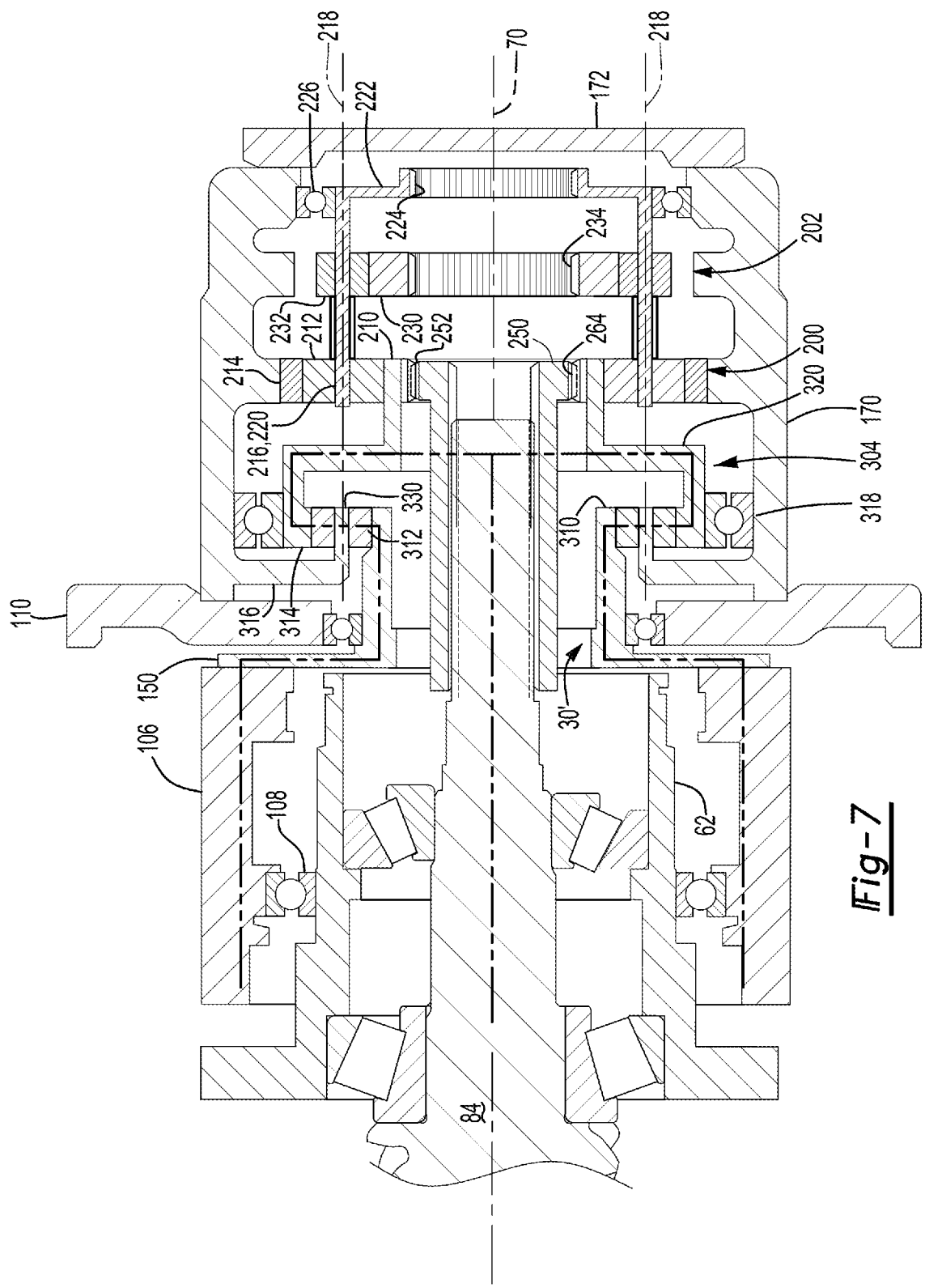

Referring to FIGS. 5-7, a second configuration of a gear reduction module 30' is shown. In this configuration, the gear reduction module 30' may include a first gear set 200, a second gear set 202, and an epicyclic gear set 304. The epicyclic gear set 304 may be axially positioned along the axis 70 between the electric motor module 26 and the first gear set 200. The first gear set 200 may be axially positioned along the axis 70 between the epicyclic gear set 304 and the second gear set 202.

The first gear set 200 and the second gear set 202 may be the same as that described above, notwithstanding with the following items.

First, the first sun gear 210 may be coupled to the epicyclic gear set 304 rather than operatively connected to the rotor 106 via the rotor output flange 150.

Second, the first sun gear 210 may be provided with a set of internal teeth 264 that may be selectively engaged by the shift collar 250. The set of internal teeth 264 may include a plurality of teeth that may be arranged around the axis 70 in a repeating pattern. The internal teeth 264 may extend toward the axis 70 and may be arranged substantially parallel to the axis 70.

Third, a second planetary ring gear 266 may be provided with the second gear set 202. The second planetary ring gear 266 may extend around the axis 70 and may receive the second set of planet gears 232. The second planetary ring gear 266 may be fixedly positioned such that the second planetary ring gear 266 is not rotatable about the axis 70. For instance, the second planetary ring gear 266 may be received inside and may be fixedly coupled to the gear reduction module housing 170 such that the second planetary ring gear 266 may not be rotatable about the axis 70.

The epicyclic gear set 304 may be axially positioned along the axis 70 between the electric motor module 26 and the first gear set 200. The epicyclic gear set 304 may be configured as a planetary gear set. For instance, the epicyclic gear set 304 may include an epicyclic sun gear 310, a set of epicyclic planet gears 312, an epicyclic planetary ring gear 314, and an epicyclic planet gear carrier 316.

The epicyclic sun gear 310 may be operatively connected to the rotor 106. For instance, the first sun gear 210 may be operatively connected to the rotor 106 such as via the rotor output flange 150. As such, the epicyclic sun gear 310 may be rotatable about the axis 70 with the rotor 106 and the rotor output flange 150. The epicyclic sun gear 310 may extend around and may receive the drive pinion 84, the shift collar 250, or both.

The set of epicyclic planet gears 312 may be rotatably disposed between the epicyclic sun gear 310 and the epicyclic planetary ring gear 314. Each epicyclic planet gear 312 may have teeth that may mesh with teeth of the epicyclic sun gear 310 that may extend away from the axis 70 and teeth of the epicyclic planetary ring gear 314 that may extend toward the axis 70. Each epicyclic planet gear 312 may be rotatable about a corresponding planet gear axis 218. In at least one configuration, members of the set of epicyclic planet gears 312 may have a smaller diameter than members of the first set of planet gears 212, a larger diameter than members of the second set of planet gears 232, or both.

The epicyclic planetary ring gear 314 may extend around the axis 70 and may receive the set of epicyclic planet gears 312. The epicyclic planetary ring gear 314 may be rotatable about the axis 70. For instance, the epicyclic planetary ring gear 314 may be received inside and may be rotatable about the axis 70 with respect to the gear reduction module housing 170. The epicyclic planetary ring gear 314 may be rotatably supported by an epicyclic support bearing assembly 318. The epicyclic support bearing assembly 318 may be received inside and may extend from the gear reduction module housing 170 to the epicyclic planetary ring gear 314. The epicyclic planetary ring gear 314 may be fixedly positioned with respect to the first sun gear 210 such that the first sun gear 210 and the epicyclic planetary ring gear 314 may be rotatable together about the axis 70 and may not rotate with respect to each other. The first sun gear 210 and the epicyclic planetary ring gear 314 may be integrally formed as a common component or may be an assembly of separate components. In the configuration shown, the epicyclic planetary ring gear 314 is connected to the first sun gear 210 by a connection portion 320. The connection portion 320 may be axially positioned between the epicyclic gear set 304 and the first gear set 200 and may extend from an end of the epicyclic planetary ring gear 314 to an end of the first sun gear 210.

The epicyclic planet gear carrier 316 may rotatably support the set of epicyclic planet gears 312. In addition, the epicyclic planet gear carrier 316 may be fixedly positioned such that the epicyclic planet gear carrier 316 may not be rotatable about the axis 70. For instance, the epicyclic planet gear carrier 316 may be fixedly positioned with respect to the gear reduction module housing 170 and the cover 110 of the electric motor module 26. The epicyclic planet gear carrier 316 may extend from the cover 110, the epicyclic planet gear carrier 316, or both. In at least one configuration, the epicyclic planet gear carrier 316 may include a support portion 330.

The support portion 330 may rotatably support the set of epicyclic planet gears 312. The support portion 330 may have any suitable configuration. For instance, the support portion 330 may include a plurality of pins that may be received inside a hole in each epicyclic planet gear 312. A roller bearing assembly may be received inside the hole in each epicyclic planet gear 312 and may extend around each pin to help rotatably support each epicyclic planet gear 312. Each pin may extend along a corresponding planet gear axis 218.

The shift collar 250 may be moveable along the axis 70 between a first position, a second position, and a third position.

Referring to FIG. 5, the shift collar 250 is shown in the first position. The shift collar 250 may couple the first planet gear carrier 216 to the drive pinion 84 when in the first position, thereby providing a first drive gear ratio. The teeth 252 of the shift collar 250 may engage and mesh with the teeth of the gear portion 224 of the first planet gear carrier 216 when in the first position. Torque may be transmitted from the rotor 106 to the epicyclic sun gear 310 such as via the rotor output flange 150, from the epicyclic sun gear 310 to the epicyclic planetary ring gear 314 and the first sun gear 210 via the set of epicyclic planet gears 312, from the first sun gear 210 to the first planet gear carrier 216 via the first set of planet gears 212, and then from the first planet gear carrier 216 to the drive pinion 84 via the shift collar 250 when the shift collar 250 is in the first position. The shift collar 250 may not couple the first sun gear 210, the second sun gear 230, or the epicyclic sun gear 310 to the drive pinion 84 when in the first position. As such, the first sun gear 210, the second sun gear 230, and the epicyclic sun gear 310 may be rotatable about the axis 70 with respect to the drive pinion 84 when the shift collar 250 is in the first position.

Referring to FIG. 6, the shift collar 250 is shown in the second position. The shift collar 250 may couple the second sun gear 230 to the drive pinion 84 when in the second position, thereby providing a second drive gear ratio that may differ from the first drive gear ratio. The teeth 252 of the shift collar 250 may engage and mesh with the internal teeth 234 of the second sun gear 230 when in the second position. Torque may be transmitted from the rotor 106 to the epicyclic sun gear 310 such as via the rotor output flange 150, from the epicyclic sun gear 310 to the epicyclic planetary ring gear 314 and the first sun gear 210 via the set of epicyclic planet gears 312, from the first sun gear 210 to the first planet gear carrier 216 via the first set of planet gears 212, from the first planet gear carrier 216 to the second sun gear 230 via the second set of planet gears 232, and then from the second sun gear 230 to the drive pinion 84 via the shift collar 250 when the shift collar 250 is in the second position. The shift collar 250 may not couple the first sun gear 210, the epicyclic sun gear 310, or the first planet gear carrier 216 to the drive pinion 84 when in the second position. As such, the first sun gear 210, epicyclic sun gear 310, and the first planet gear carrier 216 may be rotatable about the axis 70 with respect to the drive pinion 84 when the shift collar 250 is in the second position.

Referring to FIG. 7, the shift collar 250 is shown in the third position. The shift collar 250 may couple the first sun gear 210 to the drive pinion 84 when in the third position, thereby providing a third drive gear ratio that may differ from the first drive gear ratio and the second drive gear ratio. As a nonlimiting example, the drive gear ratios may be approximately 2.7, 2.5 and 1.4 respectively. The teeth 252 of the shift collar 250 may engage and mesh with the internal teeth 264 of the first sun gear 210 when in the third position. Torque may be transmitted from the rotor 106 to the epicyclic sun gear 310 such as via the rotor output flange 150, from the epicyclic sun gear 310 to the epicyclic planetary ring gear 314 and the first sun gear 210 via the set of epicyclic planet gears 312, and then from the first sun gear 210 to the drive pinion 84 via the shift collar 250 when the shift collar 250 is in the third position. The shift collar 250 may not couple the epicyclic sun gear 310, the second sun gear 230, or the first planet gear carrier 216 to the drive pinion 84 when in the third position. As such, the epicyclic sun gear 310, the second sun gear 230, and the first planet gear carrier 216 may be rotatable about the axis 70 with respect to the drive pinion 84 when the shift collar 250 is in the third position.

Figure 8:
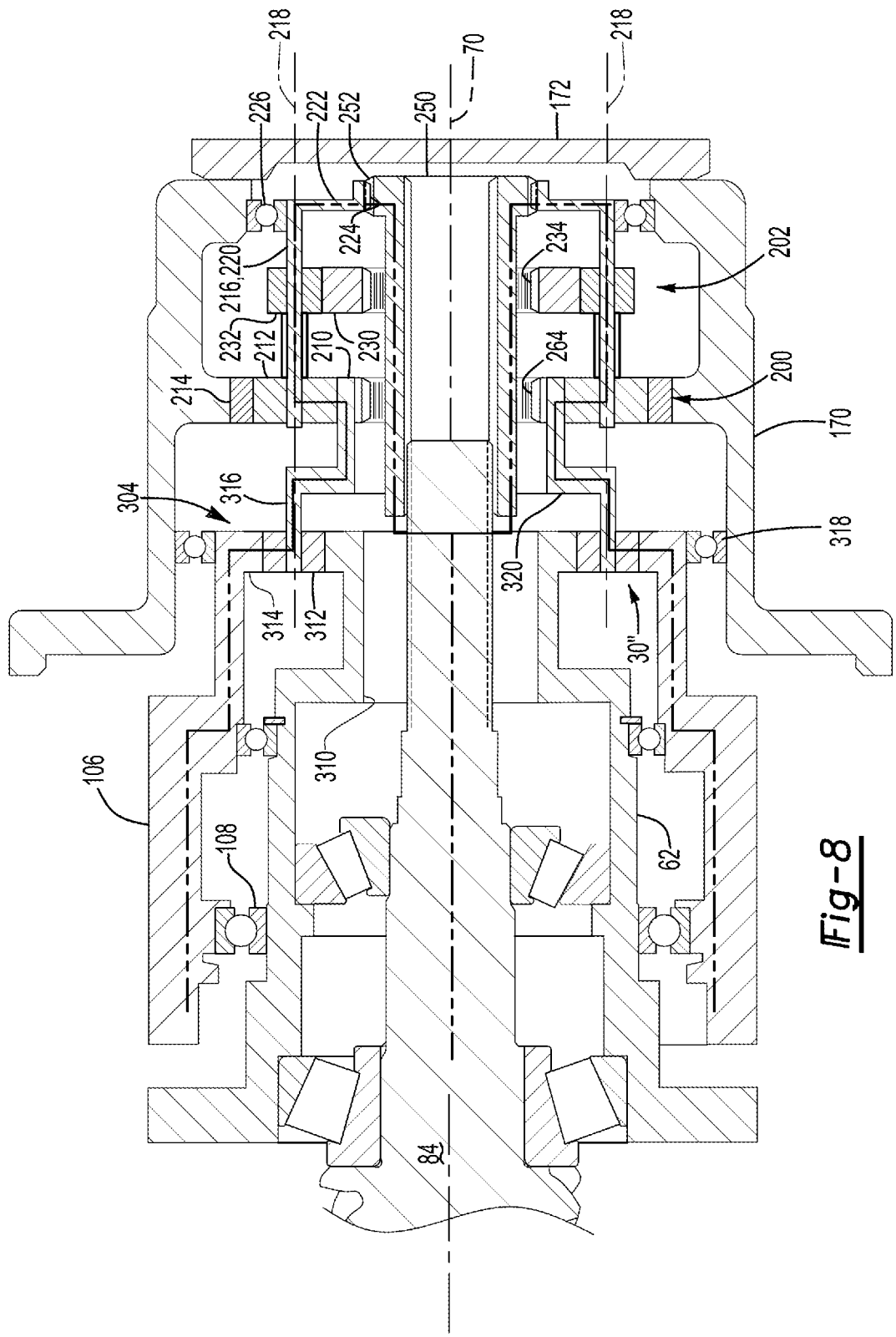
FIG. 8 is a magnified view that shows a third configuration of a gear reduction unit with a shift collar in a first position.
Figure 9:
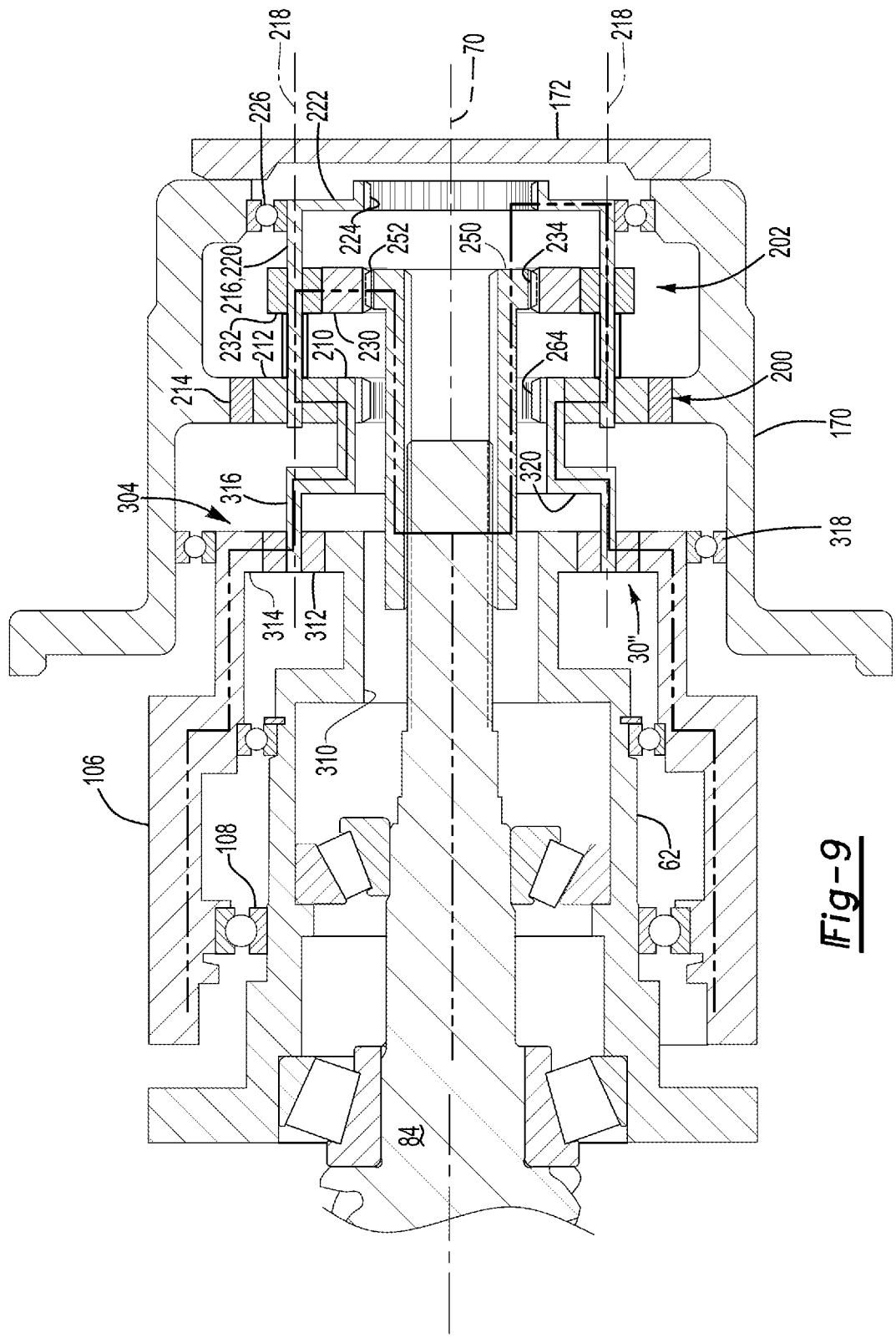
FIGS. 9 and 10 show the shift collar in second and third positions, respectively.
Figure 10:
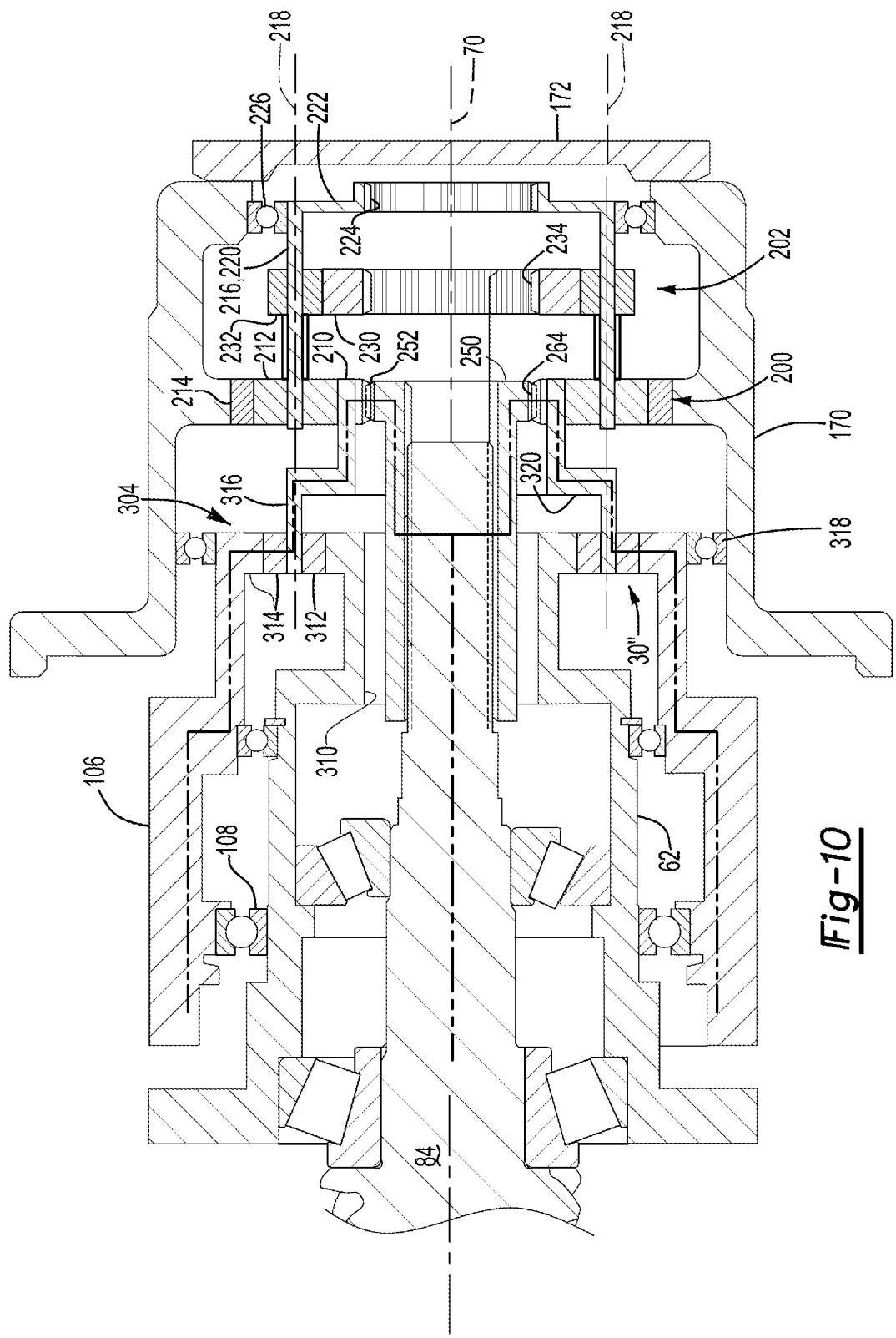

Referring to FIGS. 8-10, a third configuration of a gear reduction module 30″ is shown. In this configuration, the gear reduction module 30″ may include a first gear set 200, a second gear set 202, and an epicyclic gear set 304. As in the previous configuration, the first gear set 200 may be axially positioned between the epicyclic gear set 304 and the second gear set 202 while the epicyclic gear set 304 may be axially positioned between the electric motor module 26 and the first gear set 200.

As an overview, the configuration in FIGS. 8-10 is similar to the configuration in FIGS. 5-7, but the first sun gear 210 is connected to the epicyclic planet gear carrier 316 rather than to the epicyclic planetary ring gear 314. For instance, the epicyclic gear set 304 may be the same as that described above with respect to FIGS. 5-7 except for the following items.

First, the epicyclic sun gear 310 may be fixedly positioned such that the epicyclic sun gear 310 is not rotatable about the axis 70. For example, the epicyclic sun gear 310 may be fixedly coupled to the bearing support wall 62 of the differential carrier 42. In the configuration shown, the epicyclic sun gear 310 extends along the axis 70 into the electric motor module 26 and is coupled to the bearing support wall 62 proximate the distal end of the bearing support wall 62 that is located opposite the axle housing 40. In at least one configuration, the epicyclic sun gear 310 may be received inside the bearing support wall 62 and may be coupled to the bearing support wall 62 inside the bearing support wall 62.

Second, the epicyclic planetary ring gear 314 may be operatively connected to the rotor 106 or provided with the rotor 106, and thus may be rotatable with the rotor 106 about the axis 70. For example, the rotor 106 may be provided with a greater axial length and may receive or incorporate the epicyclic planetary ring gear 314. Alternatively, the rotor output flange 150 may be provided with a larger diameter than in the previous configurations and may extend from the rotor 106 and receive or incorporate the epicyclic planetary ring gear 314. In either configuration, the epicyclic planetary ring gear 314 may be considered to be received inside the rotor 106.

Third, the epicyclic planet gear carrier 316 may be rotatable about the axis 70. Moreover, the epicyclic planet gear carrier 316 and the first sun gear 210 may be fixedly positioned with respect to each other such that the first sun gear 210 does not rotate with respect to the epicyclic planetary ring gear 314.

Fourth, the epicyclic support bearing assembly 318 may be omitted.

It is also noted that the set of epicyclic planet gears 312 may have a smaller diameter than members of the first set of planet gears 212 and a larger diameter than members of the second set of planet gears 232 in one or more configurations.

The shift collar 250 may be moveable along the axis 70 between a first position, a second position, and a third position.

Referring to FIG. 8, the shift collar 250 is shown in the first position. The shift collar 250 may couple the first planet gear carrier 216 to the drive pinion 84 when in the first position, thereby providing a first drive gear ratio. The teeth 252 of the shift collar 250 may engage and mesh with the teeth of the gear portion 224 of the first planet gear carrier 216 when in the first position. Torque may be transmitted from the rotor 106 and epicyclic planetary ring gear 314 to the epicyclic planet gear carrier 316 and the first sun gear 210 via the set of epicyclic planet gears 312, from the first sun gear 210 to the first planet gear carrier 216 via the first set of planet gears 212, and then from the first planet gear carrier 216 to the drive pinion 84 via the shift collar 250 when the shift collar 250 is in the first position. The shift collar 250 may not couple the first sun gear 210, the second sun gear 230, or the epicyclic sun gear 310 to the drive pinion 84 when in the first position. As such, the first sun gear 210, the second sun gear 230, and the epicyclic sun gear 310 may be rotatable about the axis 70 with respect to the drive pinion 84 when the shift collar 250 is in the first position.

Referring to FIG. 9, the shift collar 250 is shown in the second position. The shift collar 250 may couple the second sun gear 230 to the drive pinion 84 when in the second position, thereby providing a second drive gear ratio that may differ from the first drive gear ratio. The teeth 252 of the shift collar 250 may engage and mesh with the internal teeth 234 of the second sun gear 230 when in the second position. Torque may be transmitted from the rotor 106 and epicyclic planetary ring gear 314 to the epicyclic planet gear carrier 316 and the first sun gear 210 via the set of epicyclic planet gears 312, from the first sun gear 210 to the first planet gear carrier 216 via the first set of planet gears 212, from the first planet gear carrier 216 to the second sun gear 230 via the second set of planet gears 232, and then from the second sun gear 230 to the drive pinion 84 via the shift collar 250 when the shift collar 250 is in the second position. The shift collar 250 may not couple the first sun gear 210, the epicyclic sun gear 310, or the first planet gear carrier 216 to the drive pinion 84 when in the second position. As such, the first sun gear 210, epicyclic sun gear 310, and the first planet gear carrier 216 may be rotatable about the axis 70 with respect to the drive pinion 84 when the shift collar 250 is in the second position.

Referring to FIG. 10, the shift collar 250 is shown in the third position. The shift collar 250 may couple the first sun gear 210 to the drive pinion 84 when in the third position, thereby providing a third drive gear ratio that may differ from the first drive gear ratio and the second drive gear ratio. As a nonlimiting example, the drive gear ratios may be approximately 2.7, 2.5 and 1.4 respectively. The teeth 252 of the shift collar 250 may engage and mesh with the internal teeth 264 of the first sun gear 210 when in the third position. Torque may be transmitted from the rotor 106 and epicyclic planetary ring gear 314 to the epicyclic planet gear carrier 316 and the first sun gear 210 via the set of epicyclic planet gears 312, and then from the first sun gear 210 to the drive pinion 84 via the shift collar 250 when the shift collar 250 is in the third position. The shift collar 250 may not couple the epicyclic sun gear 310, the second sun gear 230, or the first planet gear carrier 216 to the drive pinion 84 when in the third position. As such, the epicyclic sun gear 310, the second sun gear 230, and the first planet gear carrier 216 may be rotatable about the axis 70 with respect to the drive pinion 84 when the shift collar 250 is in the third position.

Figure 11:
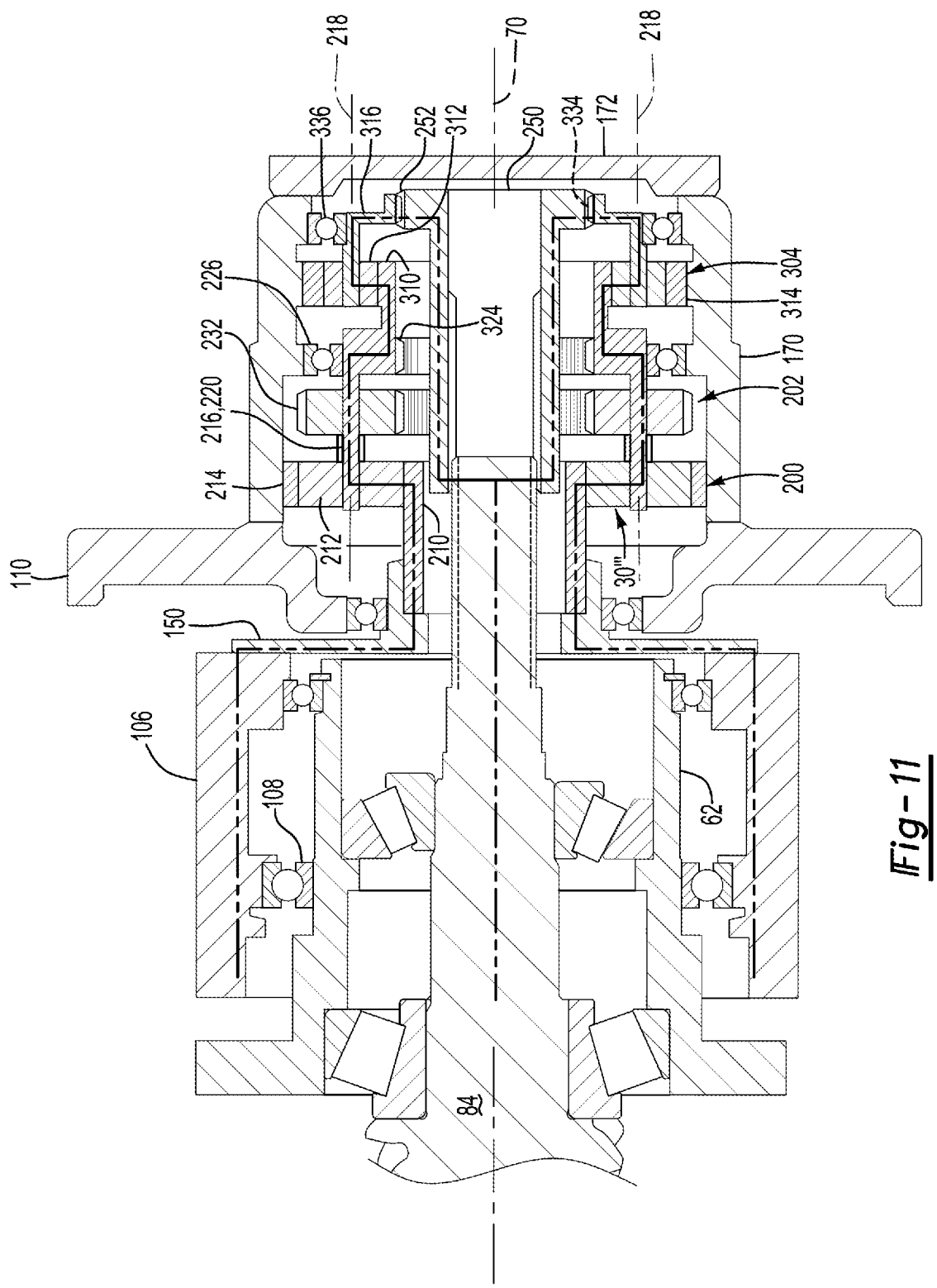
FIG. 11 is a magnified view that shows a fourth configuration of a gear reduction unit with a shift collar in a first position.
Figure 12:
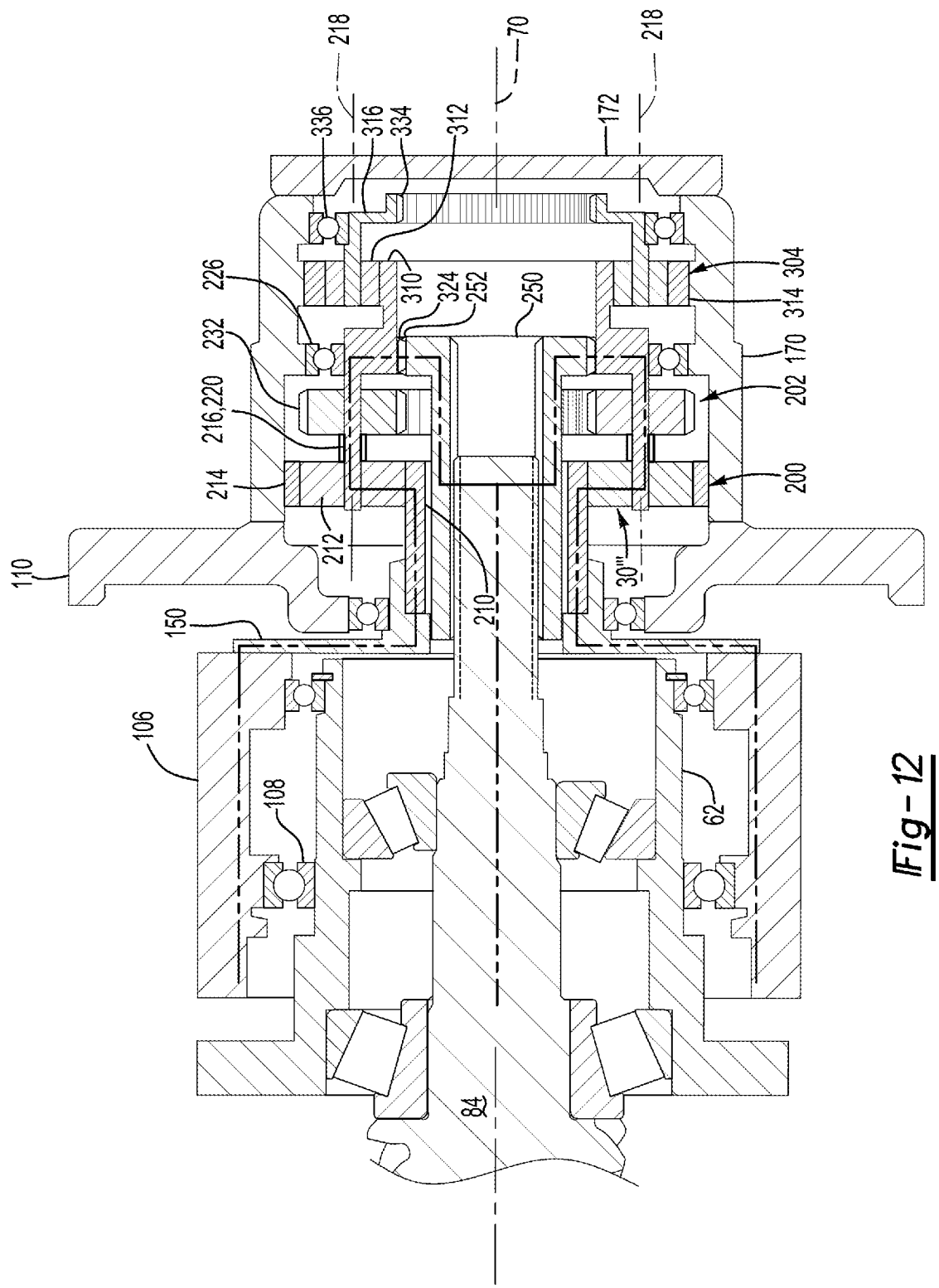

Referring to FIGS. 11-13, a fourth configuration of a gear reduction module 30''' is shown. In this configuration, the gear reduction module 30''' may include a first gear set 200, a second gear set 202, and an epicyclic gear set 304. This configuration is similar to the configuration shown in FIGS. 3 and 4 but attaches the epicyclic gear set 304 to the second gear set 202. For instance, the first gear set 200 and the second gear set 202 may be the same as that described above with respect to FIGS. 3 and 4, except that the epicyclic sun gear 310 may be operatively connected to the first planet gear carrier 216. The first gear set 200 may remain axially positioned along the axis 70 between the electric motor module 26 and the second gear set 202, but the second gear set 202 may be axially positioned along the axis 70 between the first gear set 200 and the epicyclic gear set 304.

The epicyclic gear set 304 is similar to the configuration shown in FIGS. 5-7 with the following modifications.

First, the epicyclic sun gear 310 may be coupled to the first planet gear carrier 216. For instance, the epicyclic sun gear 310 may be integrally formed with or attached to the first planet gear carrier 216. The epicyclic sun gear 310 and the first planet gear carrier 216 may be fixedly positioned with respect to each other such that the epicyclic sun gear 310 does not rotate with respect to the first planet gear carrier 216 and the epicyclic sun gear 310 and the first planet gear carrier 216 are rotatable together about the axis 70. In addition, the epicyclic sun gear 310 may include a set of internal teeth 324 that may be selectively engaged by the shift collar 250. The set of internal teeth 324 may include a plurality of teeth that may be arranged around the axis 70 and a repeating pattern. The internal teeth 324 may extend toward the axis 70 and may be arranged substantially parallel to the axis 70.

Second, the epicyclic planetary ring gear 314 may not be rotatable about the axis 70. For instance, the epicyclic planetary ring gear 314 may be fixedly mounted to the gear reduction module housing 170.

Third, the epicyclic planet gear carrier 316 may be rotatable about the axis 70. The epicyclic planet gear carrier 316 may still rotatably support the set of epicyclic planet gears 312 but may also include a set of inner teeth 334 that may be selectively engaged by the shift collar 250. The set of inner teeth 334 may include a plurality of teeth that may be arranged around the axis 70 and a repeating pattern. The inner teeth 334 may extend toward the axis 70 and may be arranged substantially parallel to the axis 70.

Fourth, the epicyclic support bearing assembly 318 that rotatably supported the epicyclic planetary ring gear 314 in FIG. 7 may be omitted.

Fifth, a support bearing assembly 336 may be provided to rotatably support the epicyclic planet gear carrier 316. The support bearing assembly 336 may extend from the gear reduction module housing 170 to the epicyclic planet gear carrier 316. For instance, the support bearing assembly 336 may be received inside the gear reduction module housing 170 and the epicyclic planet gear carrier 316 may be received inside the support bearing assembly 336. The support bearing assembly 336 may be axially positioned between the epicyclic gear set 304 and the gear reduction module cover 172.

The shift collar 250 may be moveable along the axis 70 between a first position, a second position, and a third position.

Referring to FIG. 11, the shift collar 250 is shown in the first position. The shift collar 250 may couple the epicyclic planet gear carrier 316 to the drive pinion 84 when in the first position, thereby providing a first drive gear ratio. The teeth 252 of the shift collar 250 may engage and mesh with the set of inner teeth 334 of the epicyclic planet gear carrier 316 when in the first position. Torque may be transmitted from the rotor 106 to the first sun gear 210 such as via the rotor output flange 150, from the first sun gear 210 to the first planet gear carrier 216 and the epicyclic sun gear 310 via the first set of planet gears 212, from the epicyclic sun gear 310 to the epicyclic planet gear carrier 316 via the set of epicyclic planet gears 312, and from the epicyclic planet gear carrier 316 to the drive pinion 84 via the shift collar 250 when the shift collar 250 is in the first position. The shift collar 250 may not couple the first sun gear 210, the first planet gear carrier 216, or the second sun gear 230 to the drive pinion 84 when in the first position. As such, the first sun gear 210, the second sun gear 230, and the first planet gear carrier 216 may be rotatable about the axis 70 with respect to the drive pinion 84 when the shift collar 250 is in the first position.

Referring to FIG. 12, the shift collar 250 is shown in the second position. The shift collar 250 may couple the first planet gear carrier 216/epicyclic sun gear 310 to the drive pinion 84 when in the second position, thereby providing a second drive gear ratio that may differ from the first drive gear ratio. The teeth 252 of the shift collar 250 may engage and mesh with the internal teeth 324 of the epicyclic sun gear 310 when in the second position. Torque may be transmitted from the rotor 106 to the first sun gear 210 such as via the rotor output flange 150, from the first sun gear 210 to the first planet gear carrier 216 and epicyclic sun gear 310 via the first set of planet gears 212, and then from the first planet gear carrier 216 and epicyclic sun gear 310 to the drive pinion 84 via the shift collar 250 when the shift collar 250 is in the second position. The shift collar 250 may not couple the first sun gear 210, the second sun gear 230, or the epicyclic planet gear carrier 316 to the drive pinion 84 when in the second position. As such, the first sun gear 210, second sun gear 230, and the epicyclic planet gear carrier 316 may be rotatable about the axis 70 with respect to the drive pinion 84 when the shift collar 250 is in the second position.

Referring to FIG. 13, the shift collar 250 is shown in the third position. The shift collar 250 may couple the second sun gear 230 to the drive pinion 84 when in the third position, thereby providing a third drive gear ratio that may differ from the first drive gear ratio and the second drive gear ratio. As a nonlimiting example, the drive gear ratios may be approximately 2.4, 1.6 and 2.4 respectively. The teeth 252 of the shift collar 250 may engage and mesh with the internal teeth 234 of the second sun gear 230 when in the third position. Torque may be transmitted from the rotor 106 to the first sun gear 210 such as via the rotor output flange 150, from the first sun gear 210 to the first planet gear carrier 216 via the first set of planet gears 212, from the first planet gear carrier 216 to the second sun gear 230 via the second set of planet gears 232, and then from the second sun gear 230 to the drive pinion 84 via the shift collar 250 when the shift collar 250 is in the third position. The shift collar 250 may not couple the epicyclic sun gear 310, the first sun gear 210, or the first planet gear carrier 216 to the drive pinion 84 when in the third position. As such, the epicyclic sun gear 310, the first sun gear 210, and the first planet gear carrier 216 may be rotatable about the axis 70 with respect to the drive pinion 84 when the shift collar 250 is in the third position.

Referring to FIG. 1, the axle assembly 10 may optionally include an isolator support 400. The isolator support 400 may help support the end of the axle assembly 10 that is disposed furthest from the axle housing 40 and the differential axis 80. In at least one configuration, the isolator support 400 may extend from the gear reduction module housing 170 or the gear reduction module cover 172 to a cross beam 402 that may be part of the chassis of the vehicle. For instance, the cross beam 402 may extend in a lateral direction between two frame rails of the vehicle. The isolator support 400 may include a first portion 404 that may be mounted on the gear reduction module housing 170 or the gear reduction module cover 172 and a second portion 406 that may be mounted to the cross beam 402. The isolator support 400 may allow the first portion 404 to pivot about an isolator mount axis 408 with respect to the second portion 406 and may help limit movement and acceleration of the gear reduction module housing 170. For example, it is contemplated that a portion of the isolator support 400 may include a resilient member that may be received in a hole in the first portion 404, the second portion 406 or both. It is also contemplated that the first portion 404 or the second portion 406 may be configured as a shock absorber. The isolator support 400 may be provided with any of the configurations previously discussed.

An axle assembly having gear set configurations as described above may provide multiple gear ratios or multiple speeds while providing a more compact package space. Moreover the gear set configurations may allow the difference between gear ratios to be reduced as compared to a two-speed single planetary gear configuration, which may help improve efficiency of the gear reduction unit and drivability of the vehicle. In addition, the configurations described above may allow each gear ratio to be a gear reduction with respect to the rotor speed, which may help reduce the rotational speed of the gear sets and helping reduce heating of the roller bearing assemblies associated with the gear sets and improve bearing life.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An axle assembly comprising:
   an electric motor having a rotor that is rotatable about an axis;
   a drive pinion that extends through the rotor and is rotatable about the axis;
   a gear reduction unit that includes:
      a first gear set that has a first sun gear that is operatively connected to the rotor and is rotatable about the axis, a first planetary ring gear that is fixedly positioned such that the first planetary ring gear is not rotatable about the axis, a first set of planet gears that meshes with the first sun gear and the first planetary ring gear, and a first planet gear carrier that rotatably supports the first set of planet gears; and
      a second gear set that has a second sun gear that is rotatable about the axis, a second set of planet gears that meshes with the second sun gear and that is rotatably supported on the first planet gear carrier, wherein members of the second set of planet gears have a smaller diameter than members of the first set of planet gears; and
   a shift collar that is rotatable about the axis with the drive pinion and that is moveable along the axis between a first position in which the shift collar couples the first planet gear carrier but not the first sun gear or the second sun gear to the drive pinion and a second position in which the shift collar couples the second sun gear but not the first sun gear or the first planet gear carrier to the drive pinion.

2. The axle assembly of claim 1 wherein the first gear set is axially positioned along the axis between the electric motor and the second gear set.

3. The axle assembly of claim 1 wherein the shift collar receives the drive pinion and the shift collar is received inside the first sun gear and the second sun gear.

4. The axle assembly of claim 1 wherein teeth of the second set of planet gears only mesh with teeth of the second sun gear.

5. The axle assembly of claim 1 wherein the first planet gear carrier is received inside a support bearing assembly that rotatably supports the first planet gear carrier, wherein the second gear set is axially positioned along the axis between the first gear set and the support bearing assembly.

6. The axle assembly of claim 1 wherein the first planet gear carrier has a support portion that supports the first set of planet gears, a flange portion that extends from an end of the support portion toward the axis, and a gear portion that extends from the flange portion and is selectively engaged by the shift collar.

7. The axle assembly of claim 1 wherein a support bearing assembly rotatably supports the first planet gear carrier.

8. The axle assembly of claim 7 wherein the second gear set is axially positioned along the axis between the first gear set and the support bearing assembly.

9. The axle assembly of claim 7 wherein the support bearing assembly is disposed proximate a flange portion of the first planet gear carrier.

10. The axle assembly of claim 7 wherein the support bearing assembly extends from a gear reduction module housing to the first planet gear carrier.

11. The axle assembly of claim 10 wherein the support bearing assembly is axially positioned between the second gear set and a gear reduction module cover that is disposed on the gear reduction module housing.

12. An axle assembly comprising:
   an electric motor having a rotor that is rotatable about an axis;
   a drive pinion that extends through the rotor and is rotatable about the axis;
   a gear reduction unit that includes:
      a first gear set that has a first sun gear that is operatively connected to the rotor and is rotatable about the axis, a first planetary ring gear that is fixedly positioned such that the first planetary ring gear is not rotatable about the axis, a first set of planet gears that meshes with the first sun gear and the first planetary ring gear, and a first planet gear carrier that rotatably supports the first set of planet gears; and
      a second gear set that has a second set of planet gears that is rotatably supported on the first planet gear carrier, wherein members of the second set of planet gears have a smaller diameter than members of the first set of planet gears;
   an epicyclic gear set that has an epicyclic sun gear that is fixedly positioned with respect to the first planet gear carrier such that the epicyclic sun gear does not rotate with respect to the first planet gear carrier, an epicyclic planetary ring gear that is fixedly positioned such that the epicyclic planetary ring gear is not rotatable about the axis, a set of epicyclic planet gears that meshes with the epicyclic sun gear and the epicyclic planetary ring gear, and an epicyclic planet gear carrier that rotatably supports the set of epicyclic planet gears; and
   a shift collar that is rotatable about the axis with the drive pinion and that is moveable along the axis between a first position in which the shift collar couples the epicyclic planet gear carrier but not the first sun gear or the epicyclic sun gear to the drive pinion and a second position in which the shift collar couples the epicyclic sun gear but not the first sun gear or the epicyclic planet gear carrier to the drive pinion.

13. The axle assembly of claim 12 wherein the shift collar is moveable to a third position in which the shift collar couples the second set of planet gears to the drive pinion but does not couple the first sun gear, the epicyclic sun gear, or the epicyclic planet gear carrier to the drive pinion.

14. The axle assembly of claim 12 wherein the second gear set is axially positioned along the axis between the first gear set and the epicyclic gear set and the first gear set is axially positioned along the axis between the electric motor and the second gear set.

15. The axle assembly of claim 12 wherein the shift collar receives the drive pinion and the shift collar is received inside the first sun gear, the second set of planet gears, and the epicyclic sun gear, and members of the set of epicyclic planet gears have a smaller diameter than members of the first set of planet gears and a larger diameter than members of the second set of planet gears.

16. The axle assembly of claim 12 wherein the epicyclic planet gear carrier is received inside an epicyclic support bearing assembly that rotatably supports the epicyclic planet gear carrier, wherein the epicyclic gear set is axially positioned along the axis between the second gear set and the epicyclic support bearing assembly.

17. The axle assembly of claim 12 wherein a support bearing assembly rotatably supports the first planet gear carrier.

18. The axle assembly of claim 12 wherein the epicyclic planet gear carrier includes a set of inner teeth that are selectively engaged by the shift collar.

19. The axle assembly of claim 12 wherein a support bearing assembly rotatably supports the epicyclic planet gear carrier.

20. The axle assembly of claim 19 wherein the support bearing assembly extends from a gear reduction module housing to the epicyclic planet gear carrier.

* * * * *